US008370936B2

(12) United States Patent
Zuk et al.

(10) Patent No.: US 8,370,936 B2
(45) Date of Patent: Feb. 5, 2013

(54) MULTI-METHOD GATEWAY-BASED NETWORK SECURITY SYSTEMS AND METHODS

(75) Inventors: Nir Zuk, Redwood City, CA (US); Kowsik Guruswamy, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2016 days.

(21) Appl. No.: 10/072,683

(22) Filed: Feb. 8, 2002

(65) Prior Publication Data

US 2003/0154399 A1 Aug. 14, 2003

(51) Int. Cl.
*G06F 11/00* (2006.01)
*G06F 9/00* (2006.01)

(52) U.S. Cl. ............. 726/23; 726/11; 726/26; 713/168; 713/151

(58) Field of Classification Search ............. 726/11–13, 726/22–25; 709/238–244; 713/153, 189; 705/51–54
See application file for complete search history.

(56) References Cited

U.S. PATENT DOCUMENTS

| | | | | |
|---|---|---|---|---|
| 5,598,410 A | 1/1997 | Stone | ............................ | 370/469 |
| 5,606,668 A | 2/1997 | Shwed | | |
| 5,781,550 A | 7/1998 | Templin et al. | | |
| 5,835,726 A | 11/1998 | Shwed et al. | | |
| 5,842,040 A | 11/1998 | Hughes et al. | | |
| 5,909,686 A | 6/1999 | Muller et al. | | |
| 5,960,170 A * | 9/1999 | Chen et al. | .................. | 714/38.14 |
| 6,006,264 A | 12/1999 | Colby et al. | .................. | 709/226 |
| 6,049,528 A | 4/2000 | Hendel et al. | | |
| 6,088,356 A | 7/2000 | Hendel et al. | | |
| 6,098,172 A | 8/2000 | Coss et al. | | |
| 6,119,236 A | 9/2000 | Shipley | | |
| 6,141,749 A | 10/2000 | Coss et al. | | |
| 6,154,775 A | 11/2000 | Coss et al. | | |
| 6,170,012 B1 | 1/2001 | Coss et al. | | |
| 6,205,551 B1 | 3/2001 | Grosse | | |
| 6,253,321 B1 | 6/2001 | Nikander et al. | | |
| 6,275,942 B1 | 8/2001 | Bernhard | | |
| 6,279,113 B1 | 8/2001 | Vaidya | | |
| 6,301,668 B1 * | 10/2001 | Gleichauf et al. | .............. | 726/25 |
| 6,304,975 B1 | 10/2001 | Shipley | | |

(Continued)

FOREIGN PATENT DOCUMENTS

| | | |
|---|---|---|
| JP | 10-107795 | 4/1998 |
| JP | 11-316677 | 11/1999 |

(Continued)

OTHER PUBLICATIONS

Navarro, A Partial Deterministic Automaton for Approximate String Matching, 1997, Department of Computer Science, University of Chile.*

(Continued)

*Primary Examiner* — Taghi Arani
*Assistant Examiner* — Mohammad L Rahman
(74) *Attorney, Agent, or Firm* — Harrity & Harrity, LLP

(57) ABSTRACT

Systems and methods for detecting and preventing network security breaches are described. The systems and methods present a gateway-based packet-forwarding network security solution to not only detect security breaches but also prevent them by directly dropping suspicious packets and connections. The systems and methods employ multiple techniques to detect and prevent network security breaches, including stateful signature detection, traffic signature detection, and protocol anomaly detection.

37 Claims, 16 Drawing Sheets

U.S. PATENT DOCUMENTS

| | | | |
|---|---|---|---|
| 6,311,278 B1 | 10/2001 | Raanan et al. | |
| 6,321,338 B1 | 11/2001 | Porras et al. | |
| 6,421,730 B1* | 7/2002 | Narad et al. | 709/236 |
| 6,449,647 B1 | 9/2002 | Colby et al. | 709/226 |
| 6,453,345 B2* | 9/2002 | Trcka et al. | 709/224 |
| 6,466,985 B1 | 10/2002 | Goyal et al. | 709/238 |
| 6,487,666 B1 | 11/2002 | Shanklin et al. | |
| 6,499,107 B1 | 12/2002 | Gleichauf et al. | |
| 6,591,303 B1 | 7/2003 | Hendel et al. | |
| 6,606,315 B1 | 8/2003 | Albert et al. | |
| 6,633,560 B1 | 10/2003 | Albert et al. | |
| 6,650,641 B1 | 11/2003 | Albert et al. | |
| 6,704,278 B1 | 3/2004 | Albert et al. | |
| 6,735,169 B1 | 5/2004 | Albert et al. | |
| 6,742,045 B1 | 5/2004 | Albert et al. | |
| 6,775,692 B1 | 8/2004 | Albert et al. | |
| 6,788,648 B1 | 9/2004 | Peterson | 370/252 |
| 6,851,061 B1* | 2/2005 | Holland et al. | 726/23 |
| 6,856,991 B1 | 2/2005 | Srivastava | 707/10 |
| 6,981,158 B1* | 12/2005 | Sanchez et al. | 702/188 |
| 7,006,443 B2 | 2/2006 | Storr | 370/236.1 |
| 7,017,185 B1* | 3/2006 | Wiley et al. | 726/23 |
| 7,032,037 B2 | 4/2006 | Garnett et al. | |
| 7,042,870 B1 | 5/2006 | Albert et al. | |
| 7,051,066 B1 | 5/2006 | Albert et al. | |
| 7,133,914 B1* | 11/2006 | Holbrook | 709/224 |
| 7,143,438 B1 | 11/2006 | Coss et al. | |
| 7,331,061 B1* | 2/2008 | Ramsey et al. | 726/23 |
| 7,346,686 B2 | 3/2008 | Albert et al. | |
| 7,535,907 B2 | 5/2009 | Hussain et al. | |
| 7,643,481 B2 | 1/2010 | Kadambi et al. | |
| 7,778,254 B2 | 8/2010 | Kadambi et al. | |
| 7,895,431 B2 | 2/2011 | Bouchard et al. | |
| 8,023,413 B2 | 9/2011 | Kadambi et al. | |
| 2002/0032797 A1 | 3/2002 | Xu | 709/238 |
| 2002/0124187 A1* | 9/2002 | Lyle et al. | 713/201 |
| 2003/0105881 A1* | 6/2003 | Symons et al. | 709/249 |
| 2003/0105976 A1* | 6/2003 | Copeland, III | 713/201 |
| 2003/0145225 A1* | 7/2003 | Bruton et al. | 713/201 |
| 2003/0149887 A1* | 8/2003 | Yadav | 713/200 |
| 2003/0149888 A1* | 8/2003 | Yadav | 713/200 |
| 2004/0030927 A1 | 2/2004 | Zuk | 713/201 |

FOREIGN PATENT DOCUMENTS

| | | |
|---|---|---|
| JP | 2001-313640 | 11/2001 |
| WO | WO 03/025766 A1 | 3/2003 |

OTHER PUBLICATIONS

Navarro et al., Improving an Algorithm for Approximate Pattern Matching, 1998, Department of Computer Science, University of Chile.*

"The Security Benefits of a Flow-based Intrusion Detection System". Apr. 3, 2002. Retrieved from (http://hackerproof.org/technotes/ids/whitepaper_04_03_02.pdf/www.lancope.com/www.stealthwatch.com).*

Co-pending U.S. Appl. No. 10/961,075, filed Oct. 12, 2004, entitled "Intelligent Integrated Network Security Device for High-Availability Applications," Nir Zuk et al., 24 page specification,13 sheets of drawings.

Axelsson, S., "Intrusion Detection Systems: A Survey and Taxonomy," *Dept. of Computer Eng.*, Chalmers Univ. of Technology, Goteborg, Sweden, Mar. 14, 2000.

Avolio, F., "Firewalls and Virtual Private Networks," CSI Firewall Archives, printed Nov. 13, 2001 URL: http://www.spirit.com/CSI/Papers/fw+vpns.html.

Bace, R., "An Introduction to Intrusion Detection & Assessment," ICSA Intrusion Detection Systems Consortium White Paper, 1999, URL: http://www.icsalabs.com/html/communities/ids/whitepaper/Intrusion1.pdf.

Business Wire, Inc., "NetScreen and OneSecure Unite to Deliver Industry's First Total Managed Security Services Platform," San Jose, California, Feb. 20, 2001.

Business Wire, Inc., "OneSecure Launches the First Co-Managed Security Services Platform," Denver, Colorado, Jan. 29, 2001.

Carr, Jim, "Intrusion Detection Systems: Back to Front?", Network Magazine, Sep. 5, 2001, URL: http://www/networkmagazine.com/article/NMG20010823S0007/2.

Check Point Software Technologies Ltd., Firewall-1® Technical Overview P/N 500326, www.checkpoint.com, Oct. 2000.

Cisco Systems. "IOS Firewall Intrusion Detection System," Cisco IOS Release 12.0(5)T, Mar. 2001.

Cisco Systems. "Cisco IOS Firewall Authentication Proxy," Cisco IOS Release 123.0(5)T, Mar. 2001.

Clark, D., "RFC815-IP Datagram Reassembly Algorithms," Internet RFC/STD/FYI/BCP Archives, http://www.faqs.org/rfcs/rfc815.html Jul. 1982.

Copeland, Dr. John A., "Observing Network Traffic—Techniques to Sort out the Good, the Bad, and the Ugly," PowerPoint Slide Presentation presented to ISSA-Atlanta, Jun. 27, 2001.

Denning, Dorothy E., "An Intrusion-Detection Model," IEEE Transactions on Software Engineering, vol. SE-13, No. 2, Feb. 1987, pp. 222-223.

Farrow, Rik., "An Analysis of Current Firewall Technologies," *CSI 1997 Firewalls Matrix*, printed Nov. 13, 2002 at URL: http://www.spirit.com/CSI/Papers/farrowpa.htm.

Firewall Product Comparison Table: VelociRaptor, BorderWare Firewall Server and FireWall-1/VPN-1 Gateway, www.spirit.com, printed Nov. 13, 2001.

Firewall Product Comparison Table: PIX Firewall, CyberGuard Firewall for UnixWare & CyberGuard Firewall for Windows NT, www.spirit.com, printed Nov. 13, 2001.

Firewall Product Comparison Table: CyberGuard Premium Appliance Firewall, InstaGate EX & BixGuardian VPN, www.spirit.com, printed Nov. 13, 2001.

Firewall Product Comparison Table: Server Protector 100, GNAT Box Firewall Software & Lucent Managed Firewall, www.spirit.com, printed Nov. 13, 2001.

Firewall Product Comparison Table: Internet Security and Acceleration (ISA) Server 2000, NetBSD/i386 Firewall & Guardian Firewall, www.spirit.com, printed Nov. 13, 2001.

Firewall Product Comparison Table: NetScreen-10 and NetScreen-100, CyberwalPLUS & BoarderManager, www.spirit.com, printed Nov. 13, 2001.

Firewall Product Comparison Table: Gauntlet Firewall, Barricade Class/XL & Barricade S, www.spirit.com, printed Nov. 13, 2001.

Firewall Product Comparison Table: Sidewinder™, SecurePipe Managed Firewall Service & SnapGear, www.spirit.com, printed Nov. 13, 2001.

Firewall Product Comparison Table: SonicWALL Pro, SunScreen Secure Net & WinRoute Pro 4.1, www.spirit.com, printed Nov. 13, 2001.

Firewall Product Comparison Table: WatchGuard Technologies, Inc. LiveSecurity System 4.6, www.spirit.com, printed Nov. 13, 2001.

Graham, R., "FAQ: Network Intrusion Detection System," www.robertgraham.com/pubs/network-intrusion-detection.html, Ver. 0.8.3, Mar. 21, 2000.

Habra, N. et al., "ASAX: Software Architecture and Rule-based Language for Universal Audit Trail Analysis," Proceedings of the ESORICS '92, European Symposium on Research in Computer Security, Nov. 23-25, 1992, Toulouse, Spreinger-Verlag.

Frantzen et al., "A Framework for Understanding Vulnerabilities in Firewalls Using a Dataflow Model of Firewall Internals", Computer & Security, Elsevier Science Publishers, vol. 20 No. 3, May 2001, pp. 263-270, XP004255237.

Roesch, "Snort Users Manual, Snort 1-15 Release: 1.8.1", Aug. 10, 2001, 43 pages, XP002583387.

Debar et al., "Towards a taxonomy of intrusion-detection systems", Computer Networks, Elsevier Science Publishers, vol. 31, No. 8, Apr. 23, 1999, pp. 805-822, XP004304519.

Dawson, "Intrusion Protection for Networks", Byte, vol. 20, No. 4, Apr. 1995, pp. 171-172, XP000562745.

Supplementary European Search Report corresponding to EP 03 71 0901, mailed Jun. 7, 2010, 3 pages.

Network Magazine, vol. 2, No. 2, pp. 116-119 (with English abstract).

ICSA Labs, "IDS Buyer's Guide, Parts One and Two," ICSA White Paper, Dec. 1999, URL: http://documents.iss.net/whitepapers/nvh_ids.pdf.

Jackson, K. et al., "Intrusion Detection System (IDS) Product Survey," Los Alamos National Laboratory, Los Alamos, New Mexico USA, LA-UR-99/3883 Ver 2.1, Jun. 25, 1999, URL: http://www.sekure.net/ids/00416750.pdf.

Jones, Kyle, "Introduction to Firewalls," *IT Audit.org Forum Network Management*, vol. 2, May 1, 1999, URL: http://www.itaudit.org/forum/networkmanagement/f209nm.htm.

Lancope, "The Security Benefits of a Flow-Based Intrusion Detection System," www.lancope.com, www.stealthwatch.com, White Paper, date unknown, Apr. 3, 2002.

Laplink, Inc., "Article #178 —Introduction to Firewalls," www.laplink.com/support/kb/article.asp?ID+178, Apr. 24, 2001.

McHugh, J. et al., "Defending Yourself: The Role of Intrusion Detection Systems," *Software Engineering Institute*, IEEE Software Eng., Sep./Oct. 2000.

Network ICE Corporation, "Why Firewalls Are Not Enough," at www.networkice.com/products/firewalls.html, printed Jan. 2, 2002.

Power, R., et al., "CSI Intrusion Detection System Resource—Five Vendors Answer Some No-Nonsense Questions on IDS," *Computer Security Alert #184*, Jul. 1998.

Power, R., "CSI Roundtable: Experts discuss present and future intrusion detection systems," *Computer Security Journal*, vol. XIV #1, URL: http://www.gocsi.corn/rountable.htm, 2001.

Sample, Char et al., "Firewall and IDS Shortcomings," SANS Network Security, Monterey, CA, Oct. 2000.

Smith, Gary, "A Brief Taxonomy of Firewalls—Great Walls of Fire," SANS Institute's Security Reading Room, May 18, 2001, URL: http://rr.sans.org/firewall./taxonomy.php.

Spitzner, Lance, "How Stateful is Stateful Inspection? Understanding the FW-1 State Table," http://www.enteract.com/~1spitz/fwtable.pl, Nov. 29, 2000.

Sundaram, A., "An Introduction to Intrusion Detection," www.acm.org/crossroads/xrds2-4/intrus.html, Jan. 23, 2001.

Tyson, Jeff., "How Firewalls Work," http://www.howstuffworks.com/firewall.htm/printable, printed Nov. 21, 2001.

Xinetica, Ltd., "An Overview of Intrusion Detection Systems," Xinetica White Paper, Nov. 2001, URL: http://www.xinetica.com/tech_explained/general/idsw/wp_ids.html.

Zuk, Nir, "Protect Yourself With Firewalls," www.techtv.com, Jul. 12, 2001, URL: http://www.techtv.com/screensavers/print/0,23102,3325761,00.html.

StoneBeat '*SecurityCluster White Paper*'; Aug. 2000, Stonesoft, Finland; pp. 1-9.

StoneBeat '*Secure Highly Available Enterprise—A White Paper*'; Feb. 2001; Stonesoft, Finland; pp. 1-10.

'*StoneGate White Paper*'; Mar. 2001; Stonesoft, Finland, pp. 1-6. www.stonesoft.corn/document363.html Stonesoft Corp '*StoneGate' product webpage*; pp. 1-2. Mar. 27, 2001.

www.stonesoft.com/document;183.html; Stonesoft Corp. '*Next Level of Network Accessibility*' webpage; pp. 1-1, Mar. 27, 2001.

www.stonesoft.com/document186.html; Stonesoft Corp.. '*Platforms*'; webpage pp. 1-1, Mar. 27, 2001.

'*Nokia Technical White Paper: the IP Clustering Power of Nokia VPN—Keeping Customers Connected*'; Apr. 2001; pp. 1-13.

*Nokia VPN Solutions—Nokia VPN CC2500 Gateway*; Jan. 1, 2001; product information ; pp. 1-2.

*Nokia VPN Solutions—Nokia VPN CC5200 Gateway*; Jan. 1, 2001; product information; pp. 1-2.

*Nokia VPN Solutions—Nokia VPN CC5205 Gateway*; Jan. 1, 2001; product information; pp. 1-2.

Julkunen et al., "Enhance Network Security with Dynamic Packet Filter", IEEE (1998), pp. 268-275.

Sharp et al., "Starburst: Building Next-Generation Internet Devices", Bell Labs Technical Journal 6(2), pp. 6-17 (2002).

Network Magazine, vol. 2, No. 2, pp. 116-119 (with English abstract), Feb. 2002.

Software Design, Nov. 1996, pp. 39-58 (with English abstract).

\* cited by examiner

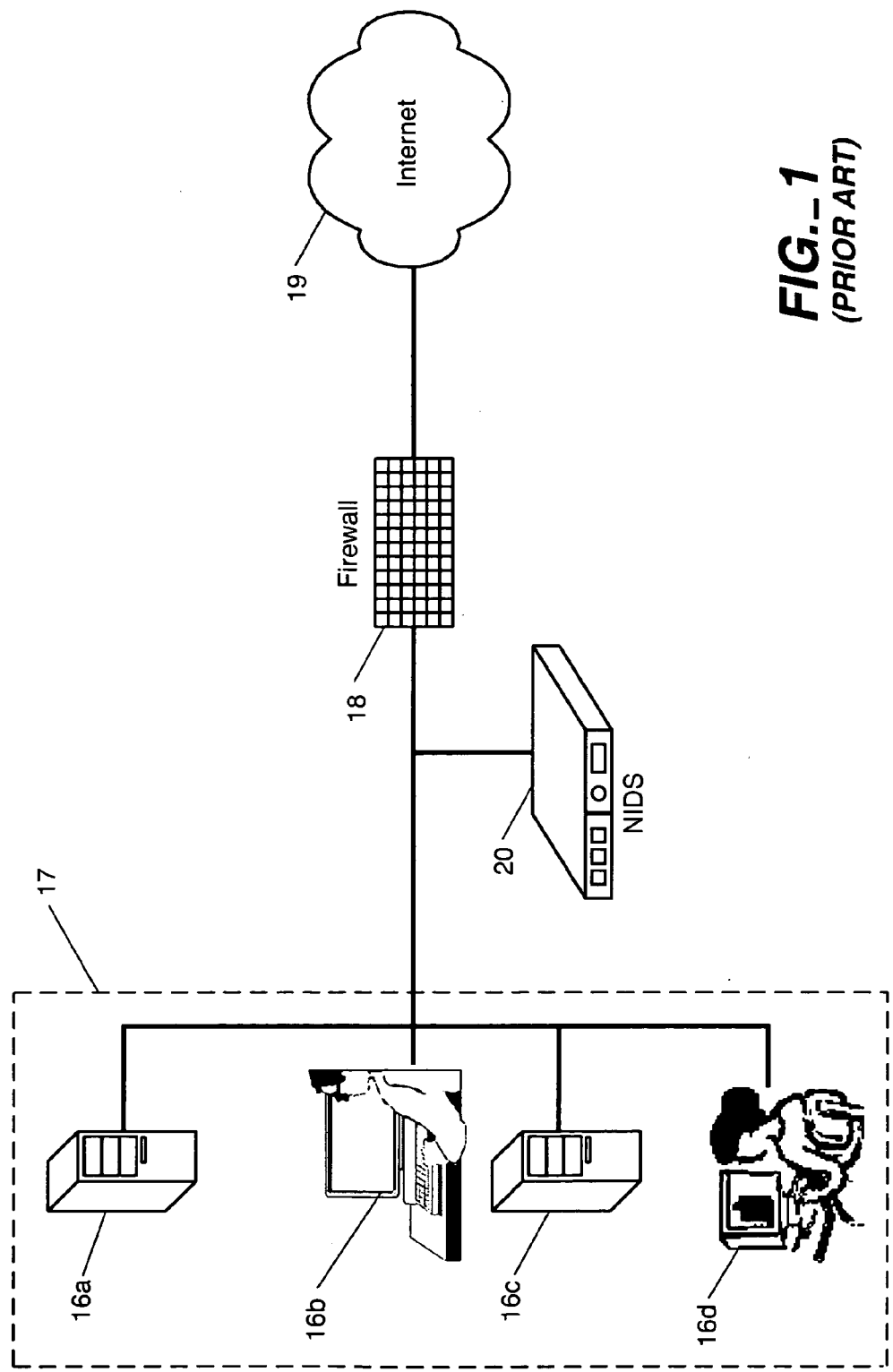
FIG._1
(PRIOR ART)

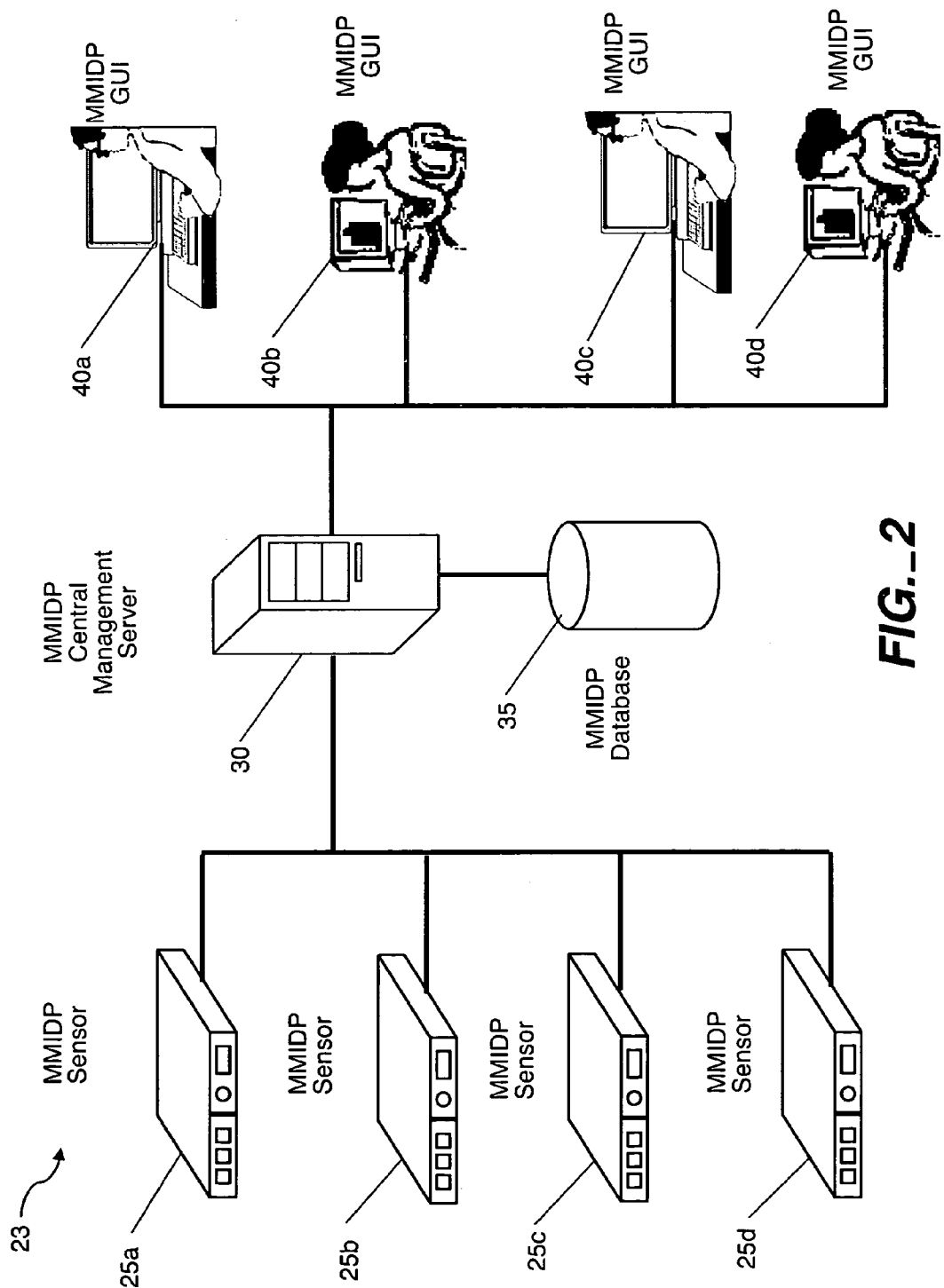
FIG._2

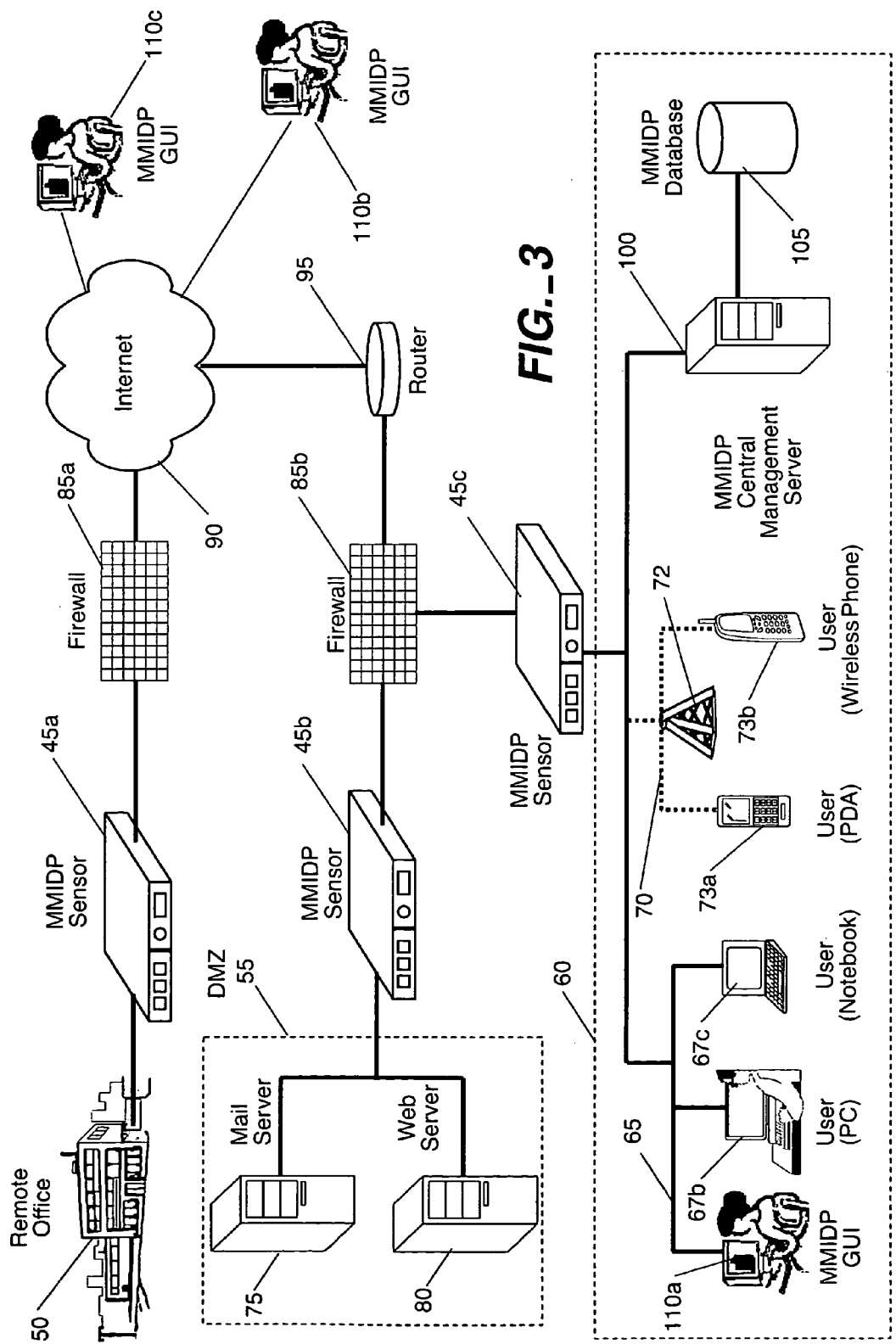
FIG._3

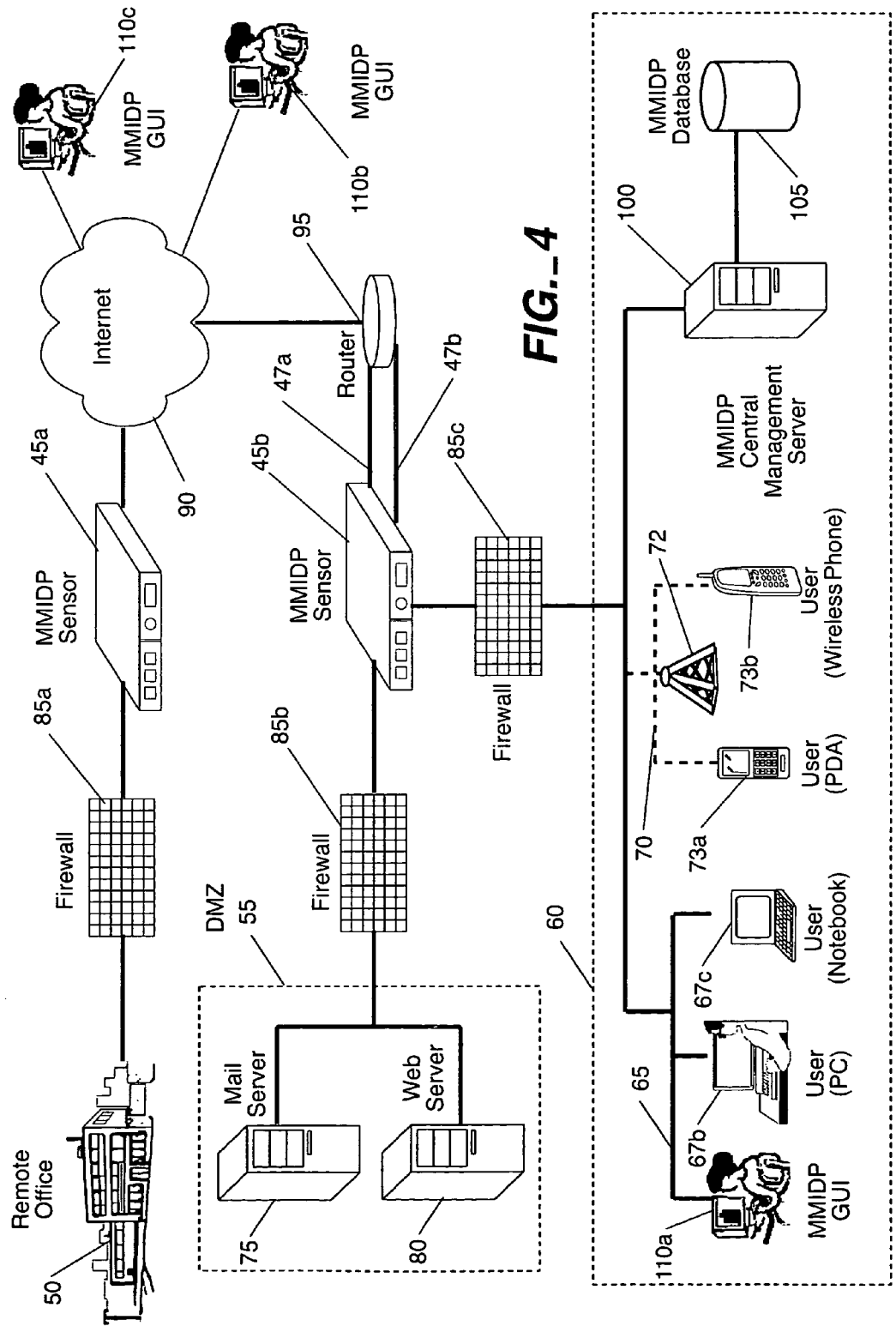
FIG._4

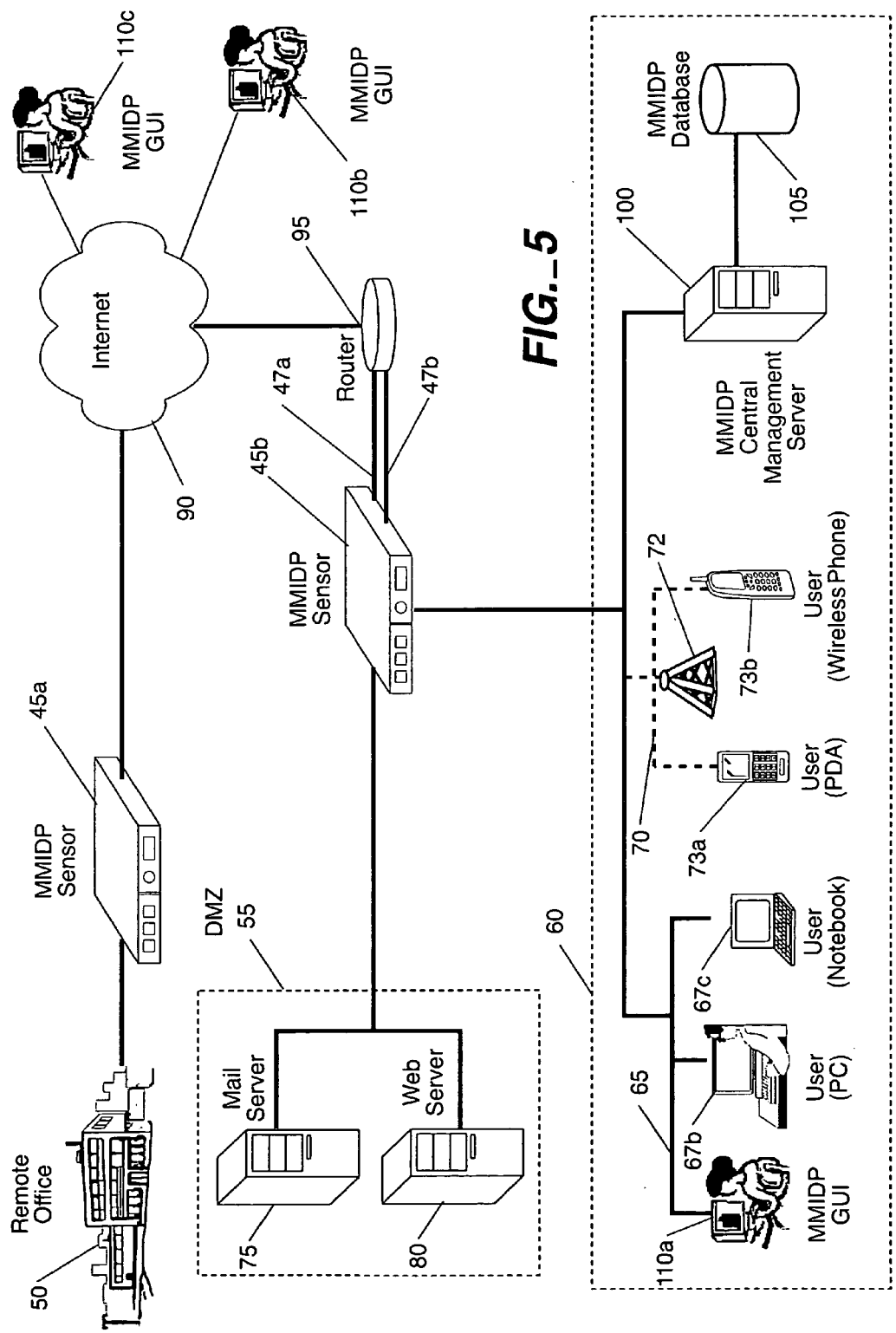
FIG._5

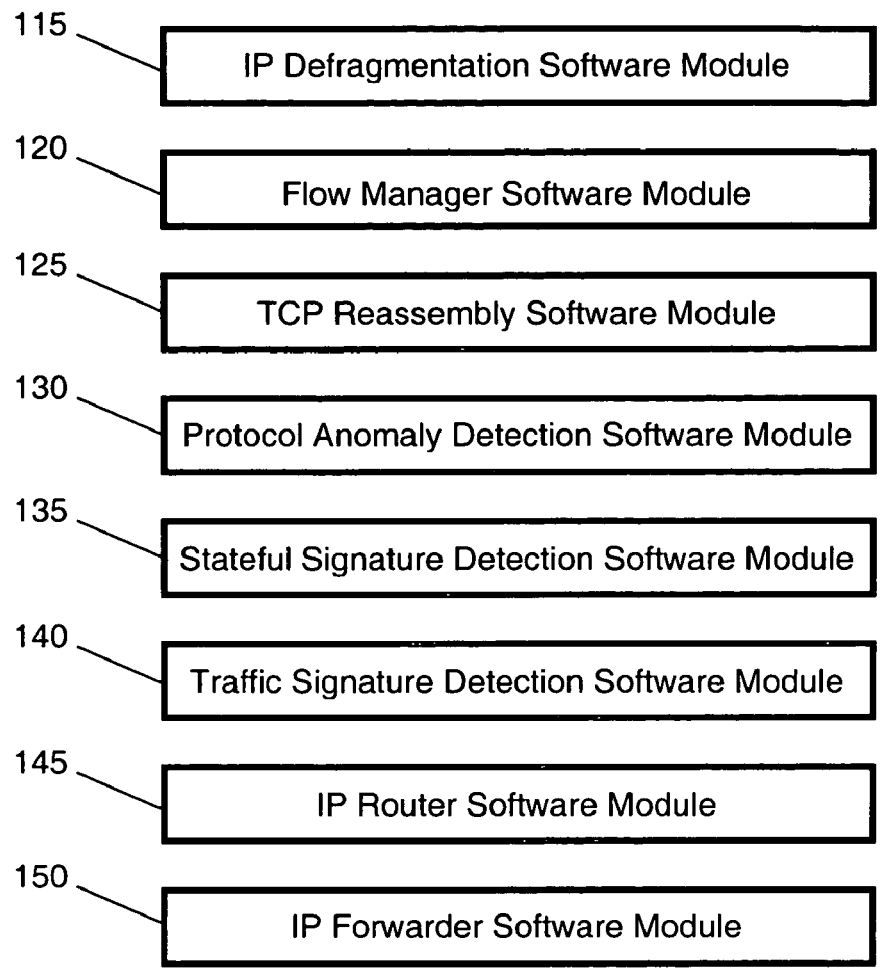
FIG._6

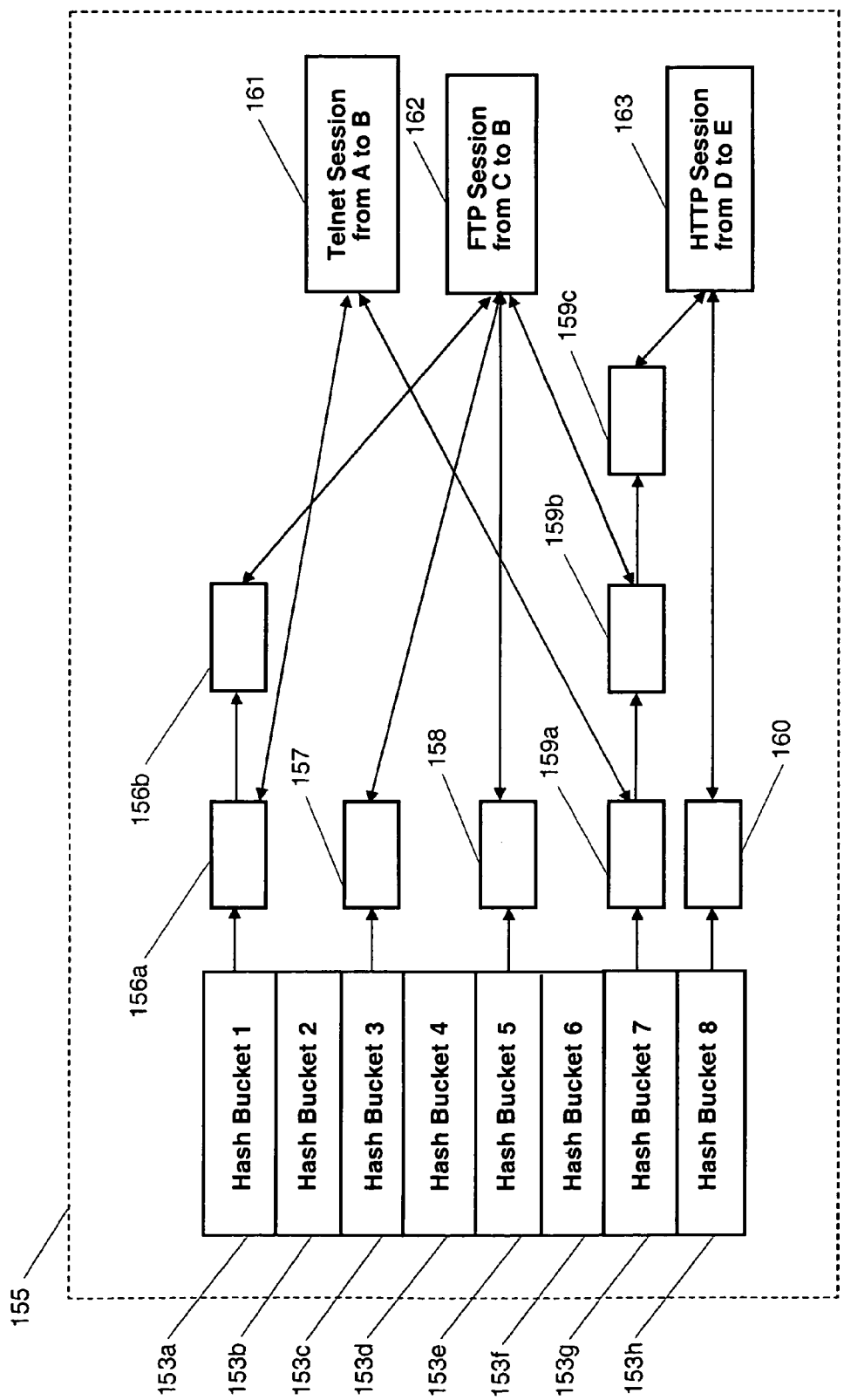
FIG._7

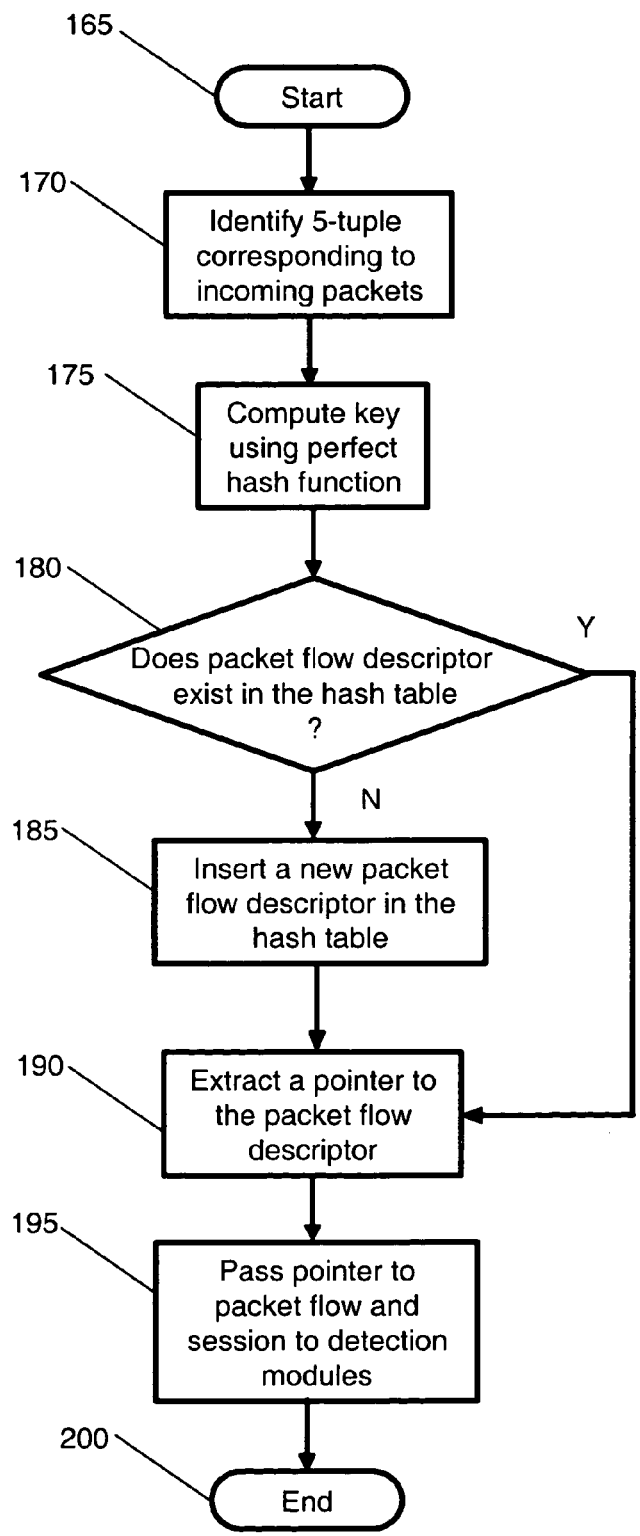
FIG._8

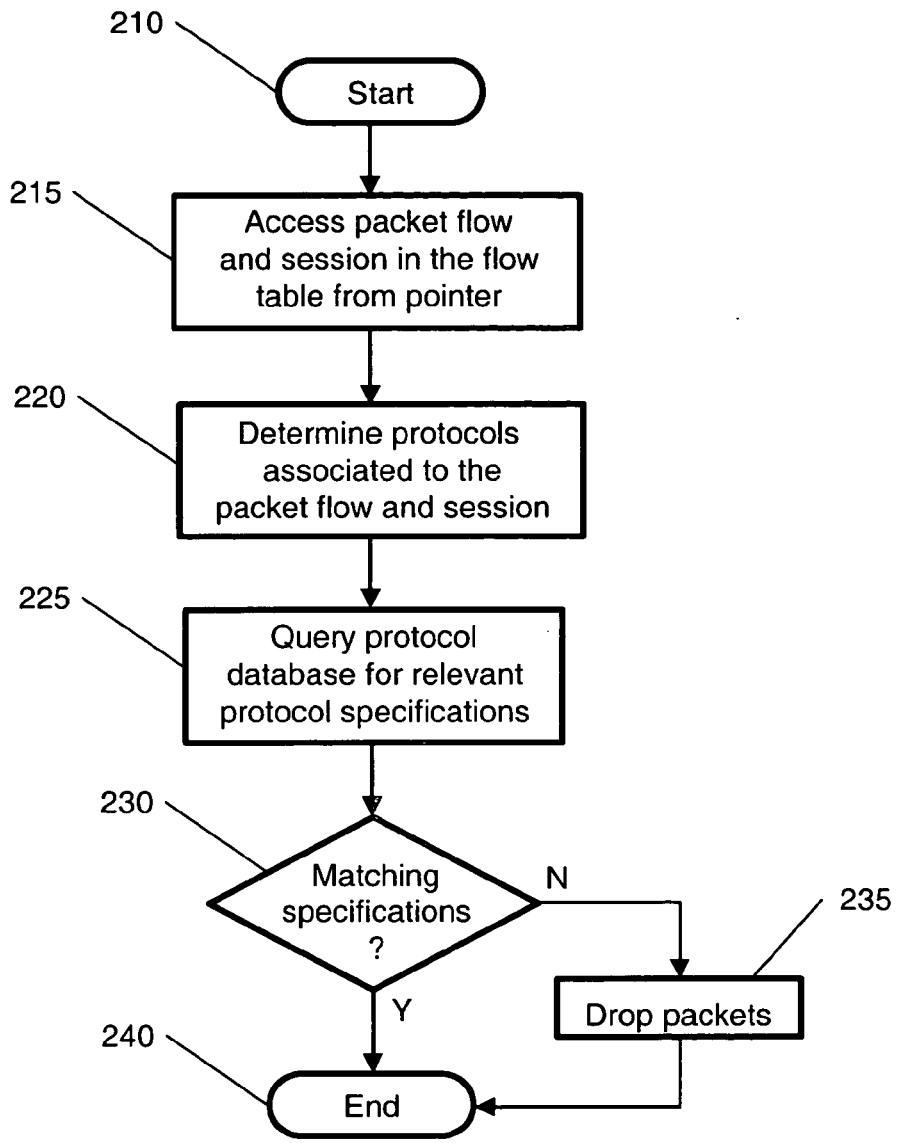
FIG._9

245

| Protocol | RFC Standard |
|---|---|
| TCP | 793, 1323, 2018 |
| HTTP | 1945, 2616 |
| SMTP | 821 |
| FTP | 959, 1579 |
| NETBIOS | |
| IMAP | |
| POP3 | |
| TELNET | |
| IRC | |
| RSH | Man pages |
| REXEC | Man pages |
| RCMD | Man pages |

FIG._10

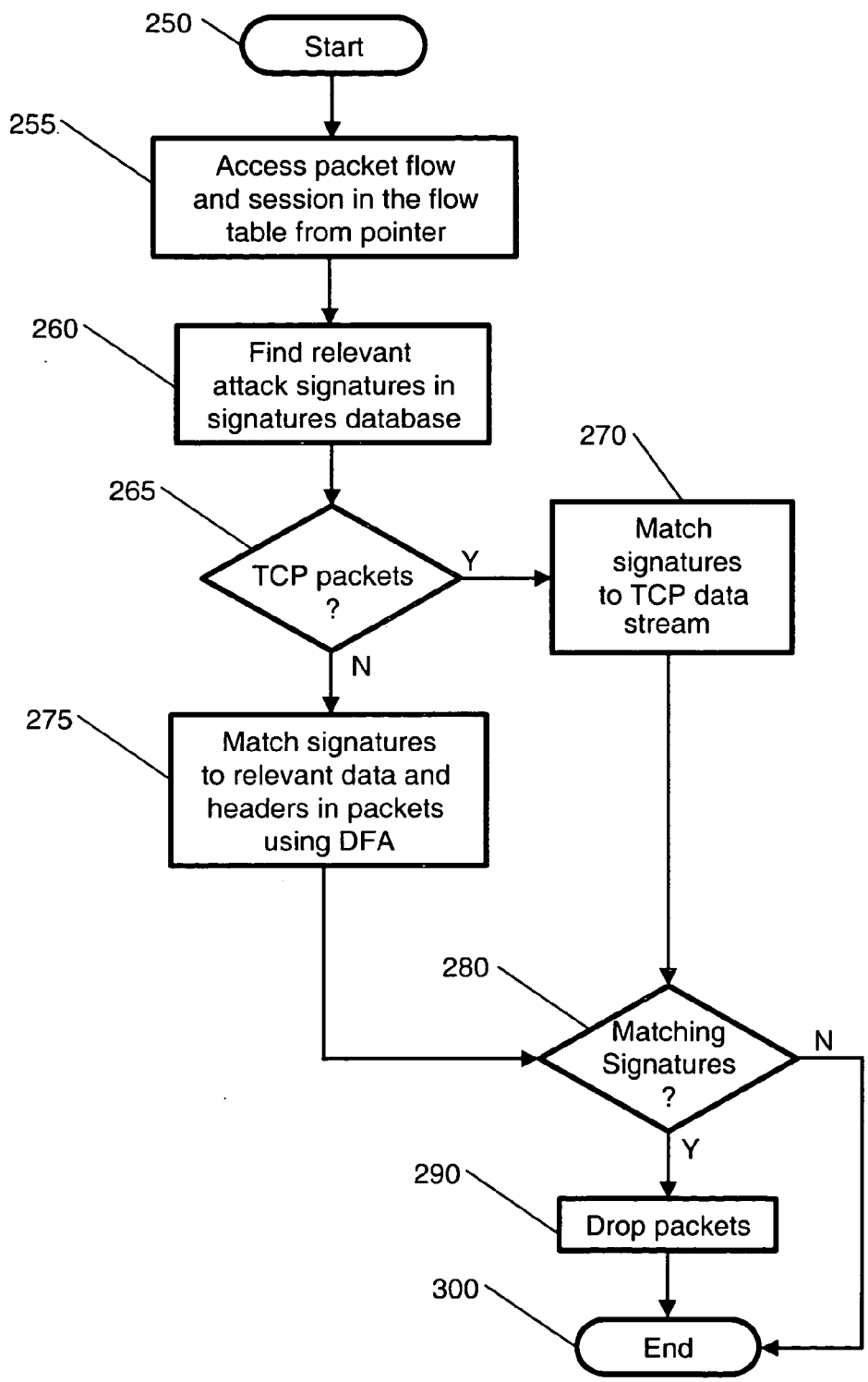
FIG._11

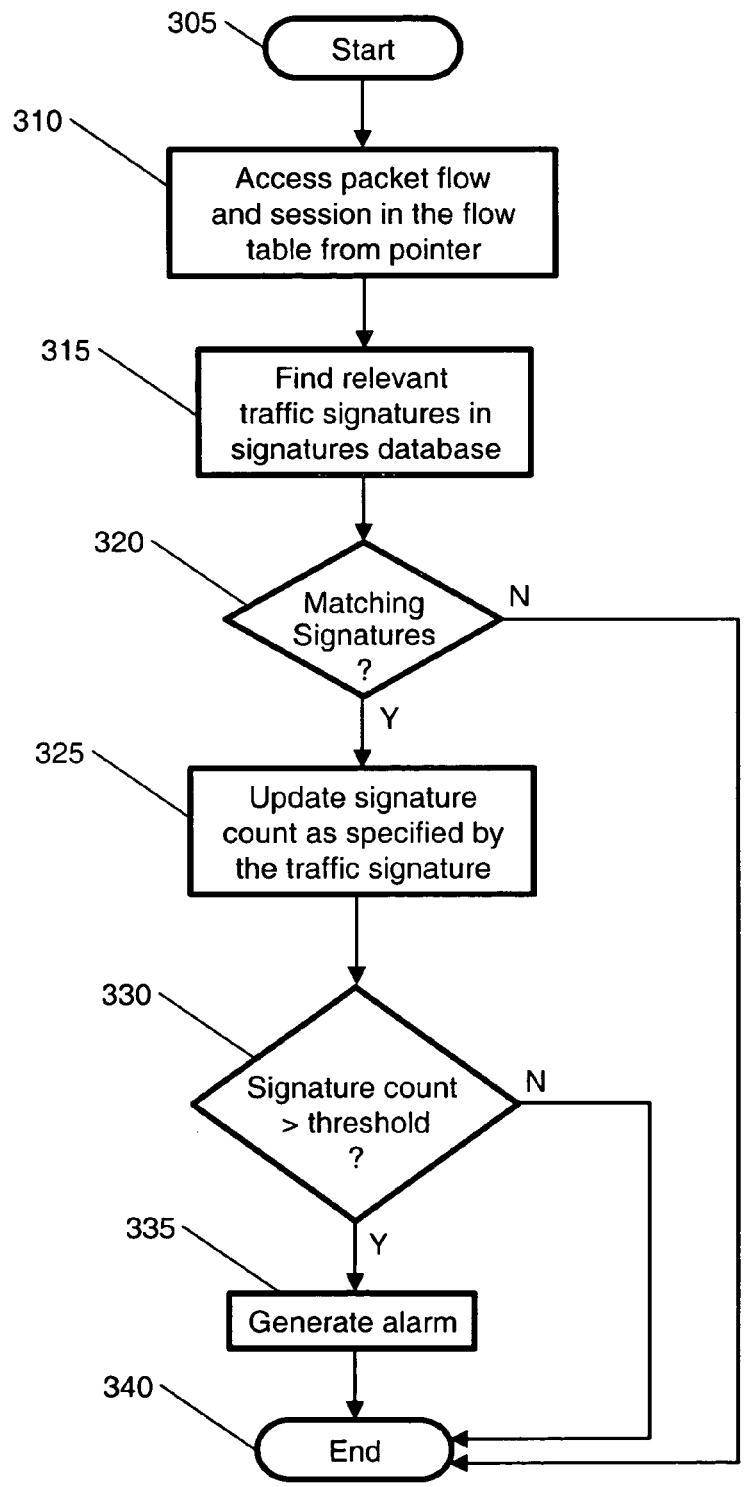
FIG._12

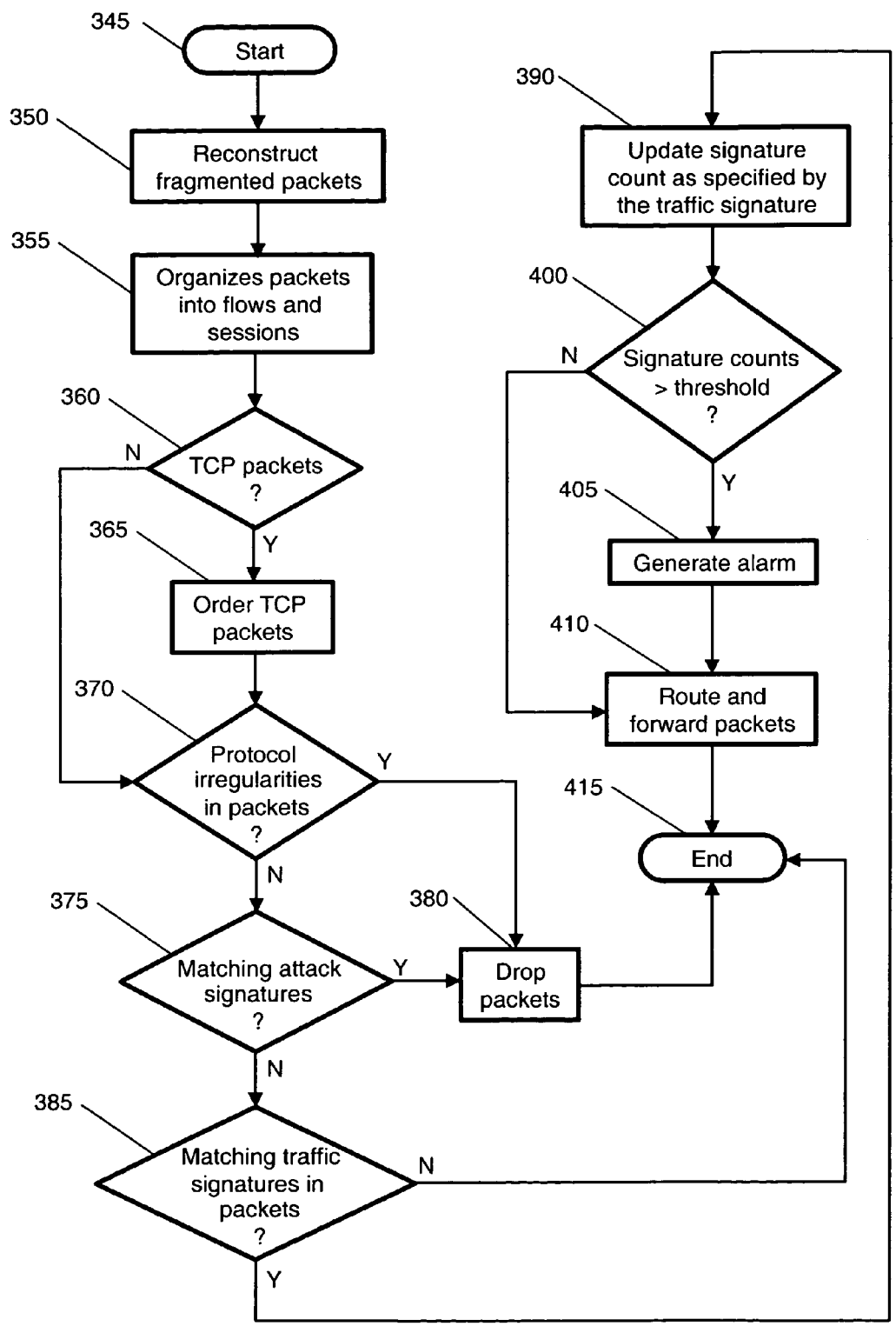
FIG._13

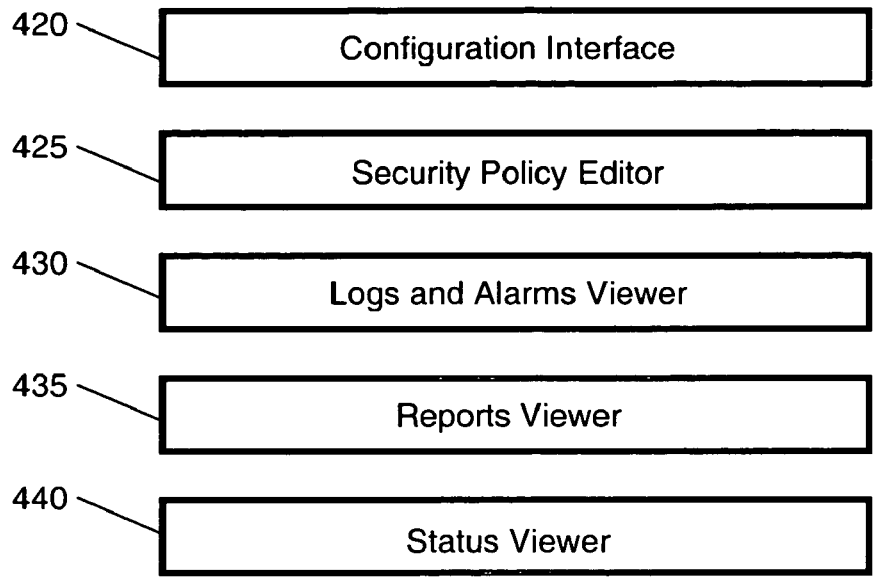
FIG._14
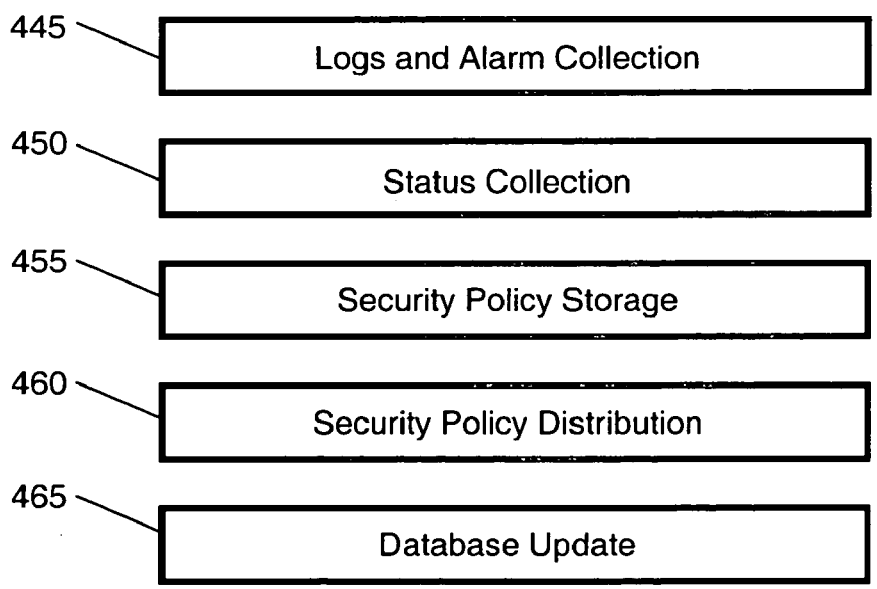
FIG._15

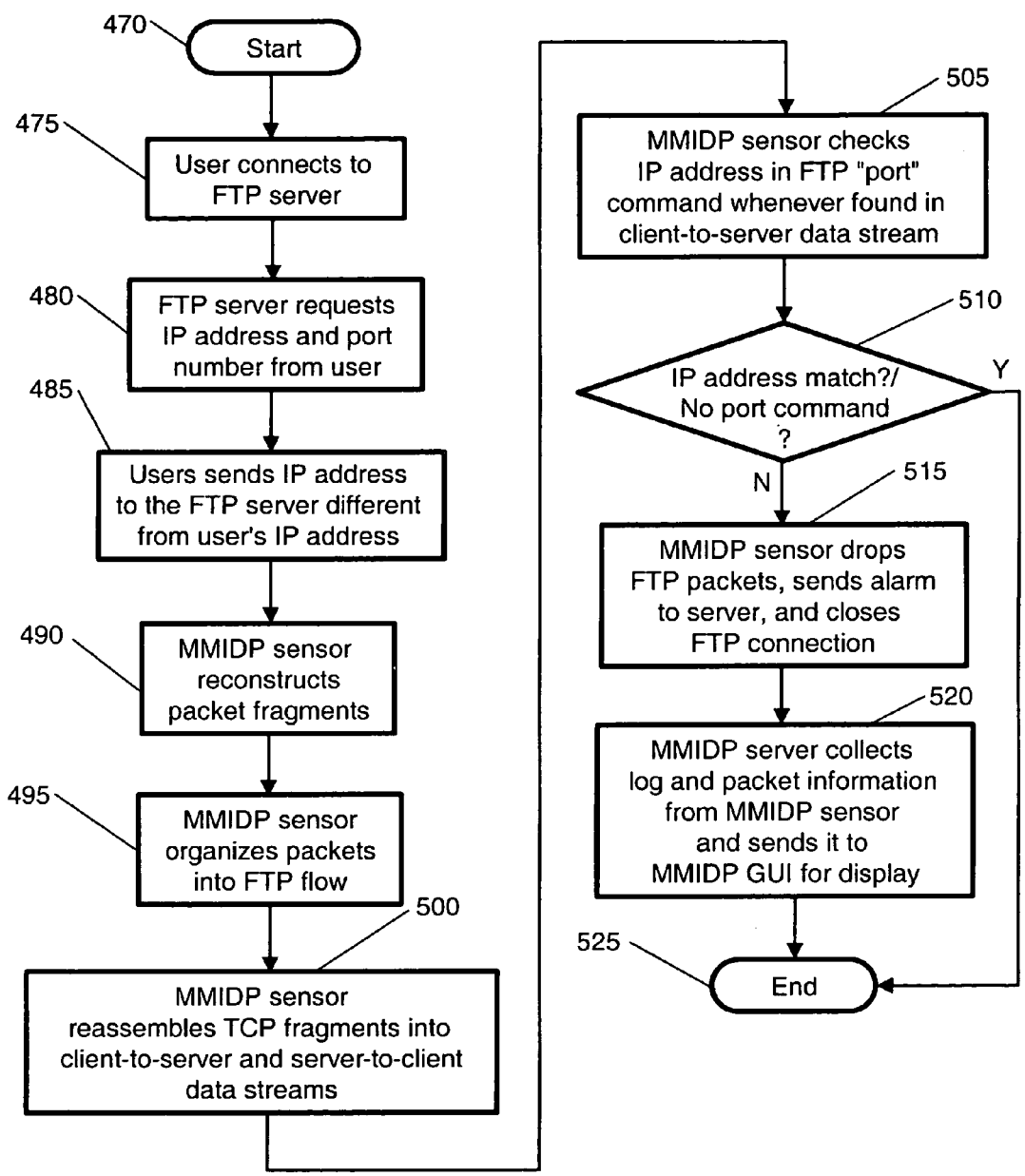
FIG._16

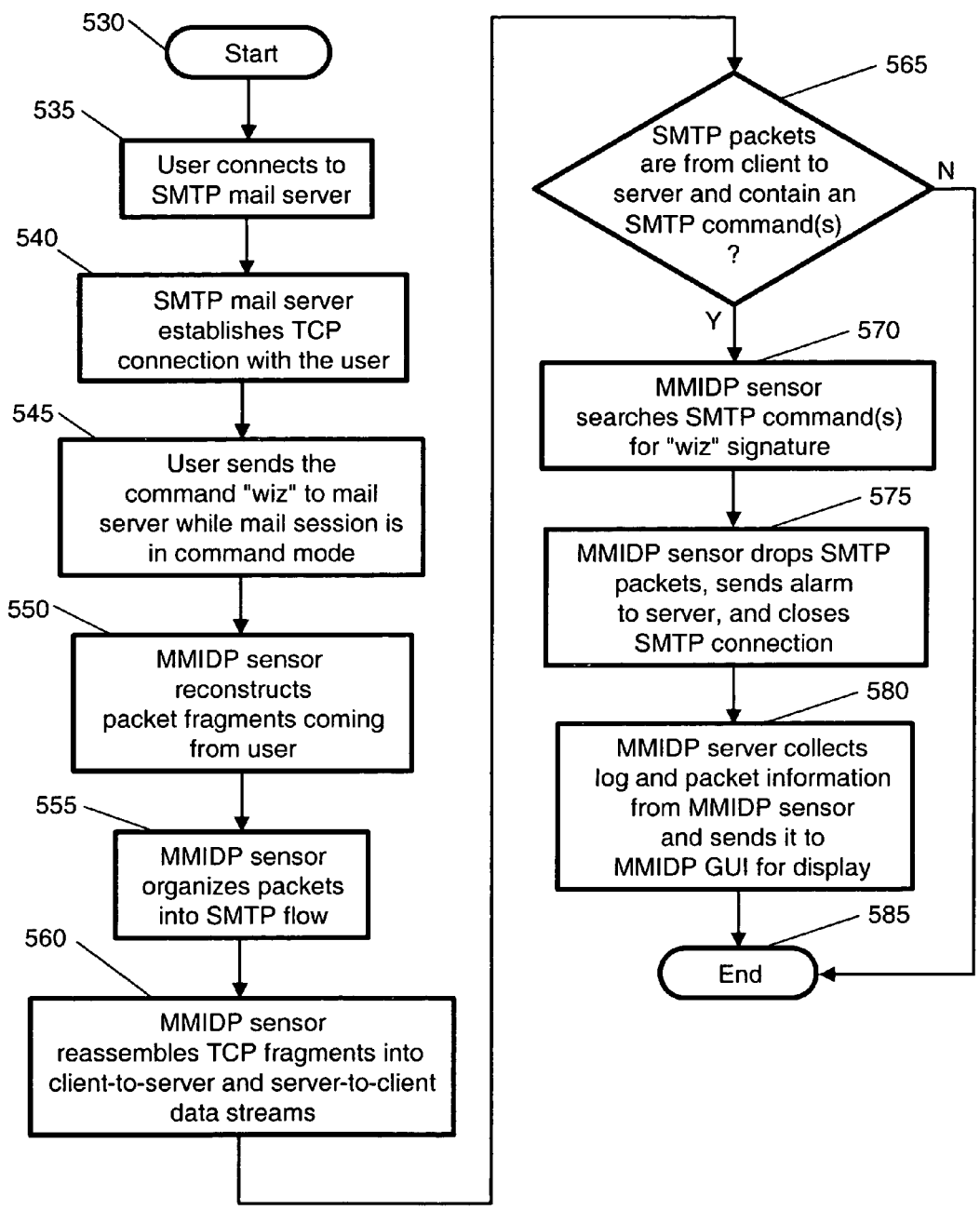
FIG._17

MULTI-METHOD GATEWAY-BASED NETWORK SECURITY SYSTEMS AND METHODS

FIELD OF THE INVENTION

This invention relates generally to network security systems and methods for detecting and preventing security breaches on a network. More specifically, the present invention provides gateway-based packet-forwarding network security systems and methods to not only detect security breaches on the network but also prevent them by directly dropping suspicious packets and connections. These systems and methods employ multiple techniques to detect and prevent intrusions, including stateful signature detection, traffic signature detection, and protocol anomaly detection.

BACKGROUND OF THE INVENTION

The explosion of the Internet has revolutionized the ways in which information is disseminated and shared. At any given time, massive amounts of information are exchanged electronically by millions of individuals worldwide using the Internet but also for engaging in a wide variety of activities, including communication, commercial transactions, and entertainment.

The Internet breaks down traditional geographical barriers by not requiring a dedicated end-to-end connection for communicating information between a source and a destination network host. Instead, Internet traffic is split up into units of information called "packets" that are routed dynamically through the network based on the most efficient route between the source and the destination at any given moment. Each of these packets includes a "header", which indicates the source from which the information originates and the destination to which it is being sent as well as other information necessary for routing the packets through the network. The source and destination are identified by means of an "IP address", a 32-bit number associated to each network host.

Packet headers conform to a set of shared "protocols" used in all Internet transmissions. Those protocols are the set of conventions that determine how information will be exchanged, often between computers from different manufacturers and running different operating systems. Internet protocols specify how the network moves data, handles errors, and allows information to be sent, received, and understood. The most fundamental protocol is called "Internet protocol", or IP, responsible for the formatting and delivery of packets across the network. Transport protocols such as UDP, TCP, and RTP, are used on top of IP to ensure that the data in the packets is received correctly, with the TCP protocol further guaranteeing that the packets are received reliably. Additional features and capabilities are provided by special-purpose protocols that are used together with the IP and transport protocols.

While the Internet protocol structure provides unparalleled benefits to users, it also facilitates unlawful activity by providing a vast, inexpensive, and potentially anonymous way for breaching security on any Internet host, including private networks of which those hosts are a part. Despite the number of potential network security vulnerabilities, current network security technologies are inadequate and ineffective to detect and prevent the increasingly sophisticated and numerous network security breaches. Examples of existing network security technologies range from operating system controls, password protection tools, and anti-virus software to more sophisticated technologies such as virtual private networks, firewalls, and intrusion detection systems.

Virtual private networks ("VPNs") are private networks established over any shared network, such as the Internet. VPNs attempt to maintain privacy through the use of security procedures involving authentication and encryption between any two VPN termination points, such as a router in a remote office, a laptop, a server application, and so on. In addition, VPNs often make use of secure tunneling protocols such as the developing standard Internet Protocol Security ("IPSec") that consists of a set of Internet security services for the IP layer, including authentication, packet integrity and confidentiality, and encryption key management. VPNs are typically integrated into firewall software to improve network security.

A firewall is a set of software programs located at a private network gateway that attempts to filter information flowing between the private network and a shared network such as the Internet. A firewall attempts to protect the private network resources from outsiders and to control the private network users' access to outside resources. There are four main types of firewalls in use today: packet filters, circuit-level gateways, application gateways, and stateful inspection. There also may be hybrid firewalls that are a combination of any two or more of all four firewall types.

Packet filtering firewalls compare header information in the incoming and outgoing IP packets on a private network against a table of rules or filters set up by the network administrator to verify whether the packets meet the requirements in the table. If a packet does not conform to those rules, the firewall will reject the packet and the packet will not be forwarded to its destination. Header information examined by packet filtering firewalls typically includes source and destination addresses, protocol type, the network interface through which the packet enters, the direction of traffic, routing, and connection state, among others. For example, a packet filtering firewall may specify that any UDP packet coming from IP addresses ranging from 232.181.20.10 to 232.181.20.255 will not be allowed into the private network.

The security of a private network having a packet filtering firewall may be increased by using Network Address Translation ("NAT") within the firewall. NAT functions like a private branch exchange in a telephone system. All the source addresses of outgoing IP packets are rewritten to the IP address assigned to the firewall to give the impression that the packets originated from the firewall rather than from the internal hosts of the private network protected by the firewall. Reply packets coming back are translated and forwarded to the appropriate host. With NAT, internal hosts are allowed to connect to hosts outside of the firewall but outside hosts cannot connect directly to the internal hosts since they are only aware of the IP address of the firewall.

Packet filtering firewalls are relatively inexpensive and do not interfere with network performance, but alone they cannot typically provide adequate security. Packet filtering rules become unmanageable in complex environments, provide no user authentication mechanisms, and are vulnerable to attacks such as IP spoofing. For example, if a hacker can figure out a trusted IP address, the hacker may forge an IP header to a harmful packet. Being unable to differentiate between a valid packet and a forged one, a packet filtering firewall would not reject the harmful packet.

Examples of packet filtering firewalls include the freely distributed software package IPFilter for UNIX-based operating systems, the freely distributed SINUS TCP/IP packet filter provided for the Linux operating system under a GNU general public license, and the protocol-based Personal Firewall PRO™ sold by Sygate Technologies, Inc., of Fremont, Calif.

Another type of firewall referred to as a circuit-level firewall operates at the session layer of the network to validate TCP/IP sessions before opening a connection. Circuit-level firewalls allow TCP packets to pass through only after a packet handshake has taken place. A packet handshake starts with the source sending a synchronize ("SYN") packet to the destination and ends with the destination sending a SYN packet and an acknowledgment ("ACK") packet back to the source. Circuit-level firewalls maintain a table of valid connections, which includes session state and sequence number information of the SYN and ACK packets, and allow packets to pass through when the network packet information matches an entry in the table. All packets transmitted after the handshake are allowed until the session is ended.

A circuit-level firewall maintains two connections per session, one between the source and the firewall and another between the firewall and the destination. As a result, all outgoing packets appear to have originated from the firewall similar to packet filtering firewalls with NAT, that is, direct contact between the source and the destination is prevented.

Circuit-level firewalls have good performance once the initial connections are established and offer a high degree of flexibility. However, they cannot examine the application-level content of the packets it is transmitting in any given connection. Once a connection has been established, any malicious application or packet can run across the connection.

Most circuit-level firewalls are implemented using the publicly available "SOCKS" networking protocol that enables hosts on one side of a SOCKS server to access hosts on the other side of the SOCKS server without requiring direct IP reachability. When an application client starts a session with an application server via a SOCKS server, the client first sends the SOCKS server a list of authentication methods it supports. The SOCKS firewall then compares these methods against the security policy defined by the network administrator, chooses an authentication method, sends a message to the client telling which authentication method to use, and finally, authenticates the client. After the client is authenticated, the SOCKS server establishes a virtual circuit between the client and the server to transmit all packets through the virtual circuit until the circuit is kept open. An example of a circuit-level firewall using SOCKS include Hummingbird SOCKS, provided by Hummingbird, Ltd., of Toronto, Canada.

To address the inherent security risk of circuit-level firewalls, application-level firewalls that operate at the application layer of the network were developed. Such firewalls run an application proxy server as an intermediary between the private network and the shared network for each allowed application, such as an FTP proxy, a HTTP proxy, a SMTP proxy for e-mail, and so on.

Application proxies are generally considered to be more secure than packet filtering or circuit-level firewalls. Similar to circuit-level firewalls, application proxies do not allow direct connections and force all packets to be screened for suitability. However, application proxies are typically slower than packet filtering or circuit-level firewalls because all packets have to be evaluated at the application layer, that is, every packet passing through an application proxy must undergo de-encapsulation/re-encapsulation before reaching its final destination. In addition, proxy servers may not have packet forwarding capabilities. Every new service requires a new proxy server, and because proxies are highly dependent on many other system components to operate correctly, such as operating systems, TCP/IP stacks, and runtime libraries, they are vulnerable to application-level security flaws and bugs.

Application-proxies are typically implemented with built-in packet filtering or stateful inspection capabilities. Examples include the VelociRaptor firewall sold by Symantec Corporation of Cupertino, Calif., the Gauntlet firewall sold by Network Associates, Inc., of Santa Clara, Calif., and the Sidewinder™ firewall sold by Secure Computing Corp., of San Jose, Calif.

The performance of packet filtering firewalls, circuit-level firewalls, and application-proxies may be improved with the use of stateful inspection. Stateful inspection firewalls are essentially packet filtering firewalls that examine not just the packet header, but also information about the packet in all communication layers of the network, such as TCP packet headers, to analyze the network traffic that traverses it.

Such firewalls monitor the state of any given network connection and compile information about the connection in a state table. Each packet request coming out of the firewall is recorded in the state table so that incoming response packets are verified against the corresponding request packets in the state table. The decision on whether to reject a packet is therefore based not only on the packet filtering rules table but also on the context that has been established by prior packets that have passed through the firewall. A packet that is a genuine response to a request packet is passed on and all others are rejected. If a response packet does not arrive in a specified period of time, the connection is timed out.

A packet filtering firewall with stateful inspection also has the ability to examine a packet in order to allow certain types of commands within an application while disallowing others. For example, a stateful inspection firewall can allow the FTP "get" command while disallowing the "put" command. In addition, stateful inspection firewalls incorporate dynamic filtering techniques to minimize the number of exposed network ports. With dynamic filtering, network ports are kept open only as required for packet flow based on packet header information, thereby reducing the attacks to open ports that are idle.

Examples of stateful inspection firewalls include the firewall described in U.S. Pat. No. 5,606,668 and the firewall product called FireWall-1, sold by Check Point Software Technologies, Inc., of Redwood City, Calif. FireWall-1 enables network administrators to define and implement a single, centrally managed security policy. The security policy is defined at a central management server by means of graphical user interface clients and downloaded to multiple enforcement points throughout the network. The security policy is defined in terms of security rules and network objects such as gateways, routers, and hosts. Packet header data is examined at all seven network layers and state information is kept of packets at all communication stages to verify IP addresses, port numbers, and any other information required to determine whether packets are permitted by the security policy.

State information is stored at a connections or state table that organizes packets according to their corresponding network connections, which are represented in the table by the source IP address, the source port, the destination IP address, the destination port, the IP protocol type, and other parameters including Kbuf, Type, Flags, and Timeout. When a packet is received by the firewall, the packet is checked against the connections table to see if there is an existing connection to which this packet belongs. If there is a connection, then the packet is forwarded to its network destination. If there is no matching connection in the state table for that specific packet, then the firewall compares it against the security policy to see if there is a match that allows the packet to pass. If there is, then the connection is added to the connections table and all subsequent packets belonging to that conversation will be forwarded along immediately, without being checked against the policy. As a result, a connection may be initially established with benign packets and then used to transmit malicious packets that will be accepted by the firewall. Another example of a stateful inspection firewall product is the PIX firewall sold by Cisco Systems, Inc., of San Jose, Calif.

The sole role of the currently available firewalls is to enforce an organization's network access policies. Such access policies specify which hosts and protocols represent good traffic, i.e., traffic that may be allowed in the network, and which ones do not. In other words, a firewall simply distinguishes good from bad traffic based on a pre-determined and static configuration embodied in the access policy. Firewalls are not capable of detecting and stopping network attacks. For example, once a firewall allows a HTTP connection, it will not be able to detect an attack against a web server carried over that connection. Furthermore, a firewall is not able to detect or prevent attacks made or appeared to be made from inside the firewall, such as the presence of a Trojan program inside the network that may be leaking confidential information to the outside.

To attempt to fill the gaps in network security left open by firewall products, "intrusion detection systems" have been developed and used in tandem with firewalls. An intrusion detection system ("IDS") collects information from a variety of system and network resources to analyze the information for signs of intrusion, i.e., attacks coming from outside the network, and misuse, i.e., attacks originating from inside the network. Intrusion detection systems can be placed inside or outside the firewall, with most network administrators choosing to place the IDS inside of the firewall as an extra layer of protection against misuse and intrusions undetected by the firewall.

There are three types of intrusion detection systems: desktop-based IDSs, host-based IDSS, and network-based IDSs. Desktop-based IDSs offer file-level protection by examining activity on individual systems, looking for potential attacks on files or registry entries. A desktop-based IDS may be useful for an individual user who connects to the Internet directly and is not part of any extensive network. A popular desktop-based IDS is the BlackICE Defender, sold by Internet Security Systems, Inc., of Atlanta, Ga.

Host-based IDSs operate on a network host, such as a web or application server, tracking and analyzing entries in the host system's application and operating system logs to detect attacks and disallowed activity. Host-based IDSs are easy and inexpensive to deploy and do not require any additional hardware. Since they monitor events local to a host, they can detect attacks and disallowed activity that may not necessarily be seen by the network. However, because they consume considerable resources, they can adversely affect the host's performance. In addition, successful intrusions that gain high levels of privilege on the network may disable host-based IDSs and remove traces of their operation entirely. Examples of host-based IDSs include the Intruder Alert IDS sold by Symantec Corporation of Cupertino, Calif., and the Tripwire IDS sold by Tripwire, Inc., of Portland, Oreg.

Network-based IDSs ("NIDSs") are designed to protect multiple network hosts simultaneously by examining all the packets flowing through a network segment. NIDSs often consist of a set of single-purpose sensors or hosts placed at various points in a network. These units monitor network traffic, perform local analysis of that traffic and report attacks to a central management unit. Unlike firewalls, which typically only examine packet header information relating to IP addresses, ports, and protocol types, NIDSs may be designed to examine all the different flags and options that can exist in a network packet header as well as the packet data or payload, thereby detecting maliciously crafted packets that are designed to be overlooked by the firewall.

The most common network intrusion detection systems are signature-based systems and protocol anomaly also known as protocol analysis) systems. Signature-based systems look for known attack patterns or signatures in network traffic. Signatures can be as simple as a character string that matches a portion of a network packet or as complex as a state machine. In general, a signature can be concerned with a process, such as the execution of a particular command, or an outcome, such as the acquisition of a root shell. When a signature-based NIDS finds a matching signature in a packet, it can then respond by taking a user-defined action, sending an alert, or performing additional logging of information.

Most signature-based NIDSs on the market use packet-signature detection, which means that they examine the raw bytes of every packet in a traffic flow to find a match for an attack pattern. As such, these systems have several drawbacks. First, since the entire traffic flow needs to be searched, network performance may be significantly diminished. Second, because more data are being searched, it is more likely for a signature to match irrelevant data and result in a false alarm. Third, since packet-signature NIDSs can only find attacks in a packet for which a signature is written, new and often very complicated attacks cannot be detected. And lastly, packet-signature NIDSs may fail to examine packets when the network traffic is too high.

Examples of signature-based NIDSs include the system described in U.S. Pat. No. 6,279,113, the SecureIDS system, sold by Cisco Systems, Inc., of San Jose, Calif., the RealSecure system, sold by Internet Security Systems, Inc., of Atlanta, Ga., and the NetProwler system, sold by Symantec Corporation, of Cupertino, Calif.

In contrast to signature-based NIDSs that examine network traffic for some previously defined intrusions, "protocol anomaly" detection NIDSs examine network traffic for abnormalities in generally accepted Internet rules of communication. These rules are defined by open protocols, published standards, and vendor-defined specifications for communications between network devices. Once an irregularity is identified, it can be used to make network security decisions.

Protocol anomaly detection NIDSs provide several advantages over signature-based NIDSs, such as the ability to detect unknown attacks, including attacks that cannot be detected by signature matching, as well as known attacks that have been slightly modified to avoid detection from signature-based NIDSs. For example, protocol anomaly detection NIDSs can detect "FTP bounce" attacks that occur when an attacker tells the FTP server to open a connection to an IP address that is different from the user's address and "overflow" attacks that exploit the common buffer overflow programming error. Nevertheless, there are attacks that conform to the protocol specifications and therefore cannot be detected by protocol anomaly detection systems. Such attacks require signatures or other methods of detection.

Examples of protocol anomaly detection NIDSs include BlackICE Guard, sold by Internet Security Systems, of Atlanta, Ga., and ManHunt, sold by Recourse Technologies, Inc., of Redwood City, Calif. An alternative to detecting abnormal network behavior as a result of protocol irregularities is suggested by StealthWatch, sold by Lancope, Inc., of Atlanta, Ga. StealthWatch proposes a "flow-based" architecture to characterize the flow of packets between two hosts that are associated with a single service, such as using a web browser to access a single web server, or using an e-mail program to access a mail server.

While the NIDSs discussed above may improve a network's security, they have several drawbacks. First, false alarms are often produced by signature-based NIDSs that do not evaluate a signature within the context of the network traffic. For example, a signature-based NIDS may scan all e-mail messages for the string "I love you" to detect the infamous Internet worm that carries that name, which will create a false alarm with some personal e-mail. Second, most of the NIDSs discussed above use a single method of detection that is insufficient to comprehensively detect intrusions. As such, false negatives are produced when the NIDSs do not detect an attack while it is occurring. For example, a protocol anomaly NIDS may generate a false negative when a hacker fools the NIDS to see network traffic differently from the target host so that the traffic can pass through the NIDS but ultimately infect the target host by using sophisticated packet and protocol tampering methods that cannot be detected by a protocol anomaly NIDS.

In addition, some NIDSs are not able to detect "port scans" and "network sweeps" used by attackers to identify potential security and system flaws that may be exploited. Port scans and network sweeps usually happen when an attacker attempts to determine which services are allowed on the network and to identify which network port would be a good entrance to an attack. The attacker may either try each and every port on a single network (port scan) or a certain port on an entire network (network sweep). That is, port scans and network sweeps are not attacks, but rather, indicators of imminent attacks. Neither signature-based nor anomaly detection NIDSs are able to identify port scans and network sweeps since a scan conforms to the particular network protocol being used to transmit the packet and the scan pattern does not appear within a particular network session.

A further drawback of most of the NIDSs discussed above is that they need to be individually managed and all sensor information resides on the sensor itself. That is, network security administrators need to access each individual sensor to activate or detect signatures, perform system management backups, and so on. As the number of sensors increases, management of the sensors becomes increasingly difficult, especially considering the often incomplete logs that are generated. In the event of failure of any sensor, the replacement sensor has to be reconfigured and tuned to match the original sensor.

Additionally, NIDSs cannot directly prevent attacks. NIDSs work as passive intrusion detection mechanisms, but are not capable to prevent attacks from occurring. When an attack is occurring on a network, these systems can notify a network security administrator to take action after the attack has already taken place but cannot prevent the attack itself. NIDSs do not sit directly in the path of traffic and cannot actively react to suspend a network connection being attacked or even redirect the intruding packets to a safer or more secure system.

An attempt to address this problem is described in U.S. Pat. No. 6,119,236, which proposes to have an NIDS direct a firewall to take action if an attack is detected to prevent the attack from spreading. That is, the NIDS does not directly prevent the attack, but simply interrupts it so that the attack may not become any worse. In doing so, the NIDS may inadvertently interrupt valid network traffic. For example, if an offending hacker is using a major Internet service provider IP address to attack the network and the NIDS system notifies the firewall to block the packets coming from this IP address, all users of the Internet service provider, malicious or not, will be denied network access.

Another proposal to address some of the deficiencies of current NIDSs is to make use of TCP reset packets to prevent TCP attacks. When a NIDS device detects a TCP attack, it sends a TCP reset packet to both the source and the destination network hosts to reset the TCP connection and prevent the attack from occurring. That is, this NIDS also does not directly prevent the attack, but simply interrupts it so that the attack may not become any worse. However, there are several problems with this approach. First, it takes a period of time for the NIDS to determine that an intrusion has been attempted and that a reset packet should be sent. During this period, the intruding packet and most likely some of the packets that follow it, may be transferred to the target network and reached the destination host. As a result, any TCP reset packet that is sent upon detection may be too late. Second, TCP reset packets are only available for the TCP protocol and cannot therefore be used to prevent attacks taking place using UDP or other connectionless protocols. And lastly, since a TCP reset packet must carry a valid sequence number within a small receiver window, a sophisticated attacker can transmit its intruding packets to have the server's receiver window change so rapidly that the NIDS will have difficulty in determining which sequence number to put in the TCP reset packet and fail to prevent the attack.

No firewall or NIDSs product, either alone or working in tandem, is able to examine packets allowed onto a network and react to disallowed packets or activity by directly dropping those packets or closing the connection. In addition, there is no hybrid NIDS that integrates signature detection, protocol anomaly detection, and other sophisticated methods such as traffic signature detection to achieve higher intrusion detection accuracy and thus reduce the rate of false positives and false negatives. There also is no NIDS that provides a centralized, policy-based management solution to control all the NIDS sensors. As a result, attempting to secure a network using technology and products available today can be impractical, if not impossible.

SUMMARY OF THE INVENTION

In view of the foregoing, it is an object of the present invention to provide network security systems and methods capable of accurately and comprehensively detecting and preventing network security breaches with low false alarm rates.

It is also an object of the present invention to provide network systems and methods that can examine packets allowed onto a network and react to disallowed packets or activity by directly dropping those packets or closing the connection.

It is also an object of the present invention to provide network security systems and methods that integrate stateful signature detection, traffic signature detection, protocol anomaly detection as well as other methods to detect and prevent network security breaches.

It is a further object of the present invention to provide network security systems and methods that enable a network security administrator to centrally manage all the network intrusion detection sensors placed on the network.

These and other objects of the present invention are accomplished by providing multi-method network security systems and methods to detect and prevent network security breaches with low false alarm rates based on stateful signature detection, traffic signature detection, and protocol anomaly detection. The multi-method network security systems, hereinafter referred to as the "MMIDP system", consists of a software and hardware solution placed directly in the path of network traffic to drop any incoming or outgoing suspicious packets before they reach network hosts or the outside network. The MMIDP system may be used by itself or in conjunction with a firewall.

The systems and methods of the present invention have been advantageously incorporated into a preferred example of an MMIDP with four main components: (1) a network intrusion detection and prevention sensor; (2) a network intrusion detection and prevention central management server; (3) a network intrusion detection and prevention central database; and (4) a network intrusion detection and prevention graphical user interface.

The network intrusion detection and prevention sensor consists of a hardware appliance that may be placed at multiple gateway points in the path of network traffic. A given sensor may operate in gateway mode to drop any incoming or outgoing suspicious packet before it reaches the network hosts or the outside network. Alternatively, a sensor may operate in passive mode to detect attacks and send alarms to the network security administrator when a network attack is taking place.

The sensor detects and prevents attacks with the use of six software modules: (1) an IP defragmentation module; (2) a flow manager software module; (3) a TCP reassembly software module; (4) a protocol anomaly detection module; (5) a stateful signature detection module; and (6) a traffic signature detection module.

The IP defragmentation software module reconstructs packets that were fragmented prior to reaching the sensor, that is, this module combines the packet fragments back into packets. After the packets are reconstructed, the flow manager software module organizes the packets into "packet flows" and associates them with a single communication session. That is, packets are organized according to whether they flow from a network client to the central management server or vice-versa, and according to whether they are part of a TELNET session, FTP session, HTTP session, and so on. In addition, the flow manager software module is capable of associating control and auxiliary flows within the same session. For example, FTP control flows and their associated FTP data flows are all combined in the same FTP session. The TCP packets in all the sessions are organized by the TCP reassembly software module, which orders the TCP packets that arrived out of order while removing packet overlaps and duplicate packets that were unnecessarily re-transmitted.

The IP defragmentation, flow manager, and TCP reassembly software modules enable the network intrusion detection and prevention sensor to search for security attacks faster and more accurately than other currently available network intrusion detection systems.

Intruding packets are detected and prevented from spreading to the private or outside networks by the protocol anomaly detection, stateful signature detection, and traffic signature detection software modules. Intruding packets are those containing network attack identifiers associated with network security breaches. Such network attack identifiers may be protocol irregularities, attack signatures, traffic signatures, or a combination of one or more of these, among others. The protocol anomaly detection module looks at the packet flows arranged by the flow manager software module to determine irregularities in the network protocol specifications in the packet. The stateful signature detection module matches known attack signatures to the TCP data stream in case of TCP packets and to the headers and data of packets transmitted with other network protocols. The traffic signature module matches traffic signatures to the network traffic to detect attacks such as port scans and network sweeps. Incoming packets that are judged malicious are dropped by the sensor before reaching any of the network hosts and likewise, outgoing packets are dropped by the sensor before reaching the outside network. The sensor may also drop all the packets in a given session if one or more of its packets are considered to be malicious.

The sensor is also equipped with an IP router software module and an IP forwarder software module to route incoming and outgoing packets to the appropriate points in the network (IP router software module) and to use the routing information to forward the packets to their destination (IP forwarder software module.) The IP forwarder software module has full control over which packets will be allowed through the sensor and will not let packets that any of the other software modules has deemed malicious to go through.

The network intrusion detection and prevention central management server controls all the multiple sensors placed on the network using a single network security policy specified by the network security administrators. The security policy defines which traffic to inspect and which attacks the sensor should look for. The server validates the security policy, loads the security policy to all the sensors, maintains a history of policy changes, and collects the logs and alarms from the sensors for storage, display, and notification, among other functions. The server also keeps a central database to store the network security policy, including older and updated versions of the policy, attack signatures, logs and alarms, and other reporting information.

Network security administrators may view the logs and alarms by means of a network detection and prevention graphical user interface. The user interface can be accessed from any client connected to the network and provides access to all the management server and sensor functionalities. The user interface enables network security administrators to view information coming from the sensors and the server to determine what is happening in the network. The information provided by the sensors and the server is organized in reports that provide access to network statistics that otherwise would be difficult to gather, such as the top IP addresses used in attacks, the top attacks, the number of alarms and incidents generated, and whether an alarm is real or false, among other statistics. In addition, network security administrators use the user interface to define the network security policy and to instruct the central management server to distribute the security policy to some or all of the sensors. All communications between the user interface, the server, and the sensors are protected by encryption and authentication mechanisms.

Advantageously, the systems and methods of the present invention detect and prevent network security breaches accurately and immediately. Those systems and methods are able to detect with low false alarm rates a multitude of attacks not detected by current network security products. In addition, the systems and methods of the present invention permit convenient, useful, and cost effective central management of an organization's network security.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 1 is a schematic diagram of a prior art network environment protected by a firewall and a network intrusion detection system;

FIG. 2 is a schematic diagram of the software and hardware components used in the disclosed example of an MMIDP system;

FIG. 3 is a schematic diagram of a preferred MMIDP system and the network environment in which the systems and methods of the present invention operate;

FIG. 4 is a schematic diagram of an alternative MMIDP system and the network environment in which the systems and methods of the present invention operate;

FIG. 5 is a schematic diagram of another alternative MMIDP system and the network environment in which the systems and methods of the present invention operate;

FIG. 6 is a schematic view of the exemplary software modules used in the network intrusion detection and prevention sensor;

FIG. 7 is an exemplary flow table constructed by the flow manager software module;

FIG. 8 is a flow chart showing exemplary steps taken by the flow manager software module when new packets arrive at the network intrusion detection and prevention sensor;

FIG. 9 is a flow chart showing exemplary steps taken by the protocol anomaly detection software module when packets arrive at the network intrusion detection and prevention sensor running at gateway mode;

FIG. 10 is an exemplary table of protocols supported by the private network;

FIG. 11 is a flow chart showing exemplary steps taken by the stateful signature detection software module when packets arrive at the network intrusion detection and prevention sensor running at gateway mode;

FIG. 12 is a flow chart showing exemplary steps taken by the traffic signature detection software module when packets arrive at the network intrusion detection and prevention sensor running at gateway mode;

FIG. 13 is a flow chart showing exemplary steps taken by the network intrusion detection and prevention sensor when determining the validity of an incoming or outgoing packet;

FIG. 14 is a schematic view of exemplary functions performed by the network intrusion detection and prevention graphical user interface;

FIG. 15 is a schematic view of exemplary functions performed by the network intrusion detection and prevention central management server;

FIG. 16 is a flow chart illustrating exemplary steps taken by a network intrusion detection and prevention sensor, server, and graphical user interface when an FTP bounce attack is imminent on the network; and FIG. 17 is a flow chart illustrating exemplary steps taken by a network intrusion detection and prevention sensor, server, and graphical user interface when a SMTP "wiz" attack is imminent on the network.

DETAILED DESCRIPTION OF THE INVENTION

Referring to FIG. 1, a schematic diagram of a prior art network environment protected by a firewall and a network intrusion detection system is described. The connection between Internet 19 and private network 17, consisting of servers 16a and 16c and computers 16b and 16d, is guarded by firewall 18. Firewall 18 inspects all the packets flowing from Internet 19 to private network 17 and controls the access of users in private network 17 to outside resources. Any packet not conforming to static heuristics predetermined by the network access policy will be rejected by firewall 18, and not allowed inside private network 17.

Network intrusion detection system (NIDS) 20 is placed behind firewall 18 to inspect the packets allowed into network 17 by firewall 18. NIDS 20 is a passive device, capable only of sending an alarm to the network security administrator of private network 17 to warn that private network 17 is under attack, or in certain cases, of directing firewall 18 to take action if an attack is detected.

Referring now to FIG. 2, a schematic diagram of the software and hardware components used in the disclosed example of an MMIDP system is described. MMIDP system 23 is installed on a private network to detect and prevent security breaches on the network. MMIDP system 23 consists of MMIDP sensors 25a-d, MMIDP central management server 30, MMIDP database 35, and MMIDP graphical user interfaces ("GUIs") 40a-d.

MMIDP sensors 25a-d are hardware appliances placed at multiple gateway points on a private network, that is, at any point in the network that acts as an entrance to other networks, such as the Internet. MMIDP sensors 25a-d are all centrally managed from MMIDP server 30. Network administrators use MMIDP GUIs 40a-d to define a network security policy and to instruct MMIDP central management server 30 to distribute the security policy to some or all of MMIDP sensors 25a-d. The network security policy defines which traffic to inspect and which attacks MMIDP sensors 25a-d should look for.

In a preferred embodiment, MMIDP sensors 25a-d operate in gateway mode to prevent attacks by dropping any suspicious packet before it reaches its intended recipient, either inside or outside the private network or by interrupting or closing the network connection generating the attacks. MMIDP sensors 25a-d operating in gateway mode not only detect network attacks but also prevent them from occurring. Alternatively, MMIDP sensors 25a-d may operate in passive mode to detect attacks and send alarms that are displayed in MMIDP GUIs 40a-d to the network security administrators when a network attack is taking place. The network security administrators then may decide on an appropriate course of action to control the network attack.

MMIDP sensors 25a-d are equipped with eight software modules described below that operate on the network packets to detect and prevent network security breaches: (1) an IP defragmentation software module; (2) a flow manager software module; (3) a TCP reassembly software module; (4) a protocol anomaly detection software module; (5) a stateful signature detection software module; (6) a traffic signature detection software module; (7) an IP router software module; and (8) an IP forwarder software module.

MMIDP sensors 25a-d are all centrally managed from MMIDP server 30. MMIDP server 30 validates the network security policy defined by the network security administrators using MMIDP GUIs 40a-d, which transmit the policy to server 30, loads the security policy to some or all MMIDP sensors 25a-d, maintains a history of policy changes, and collects the logs and alarms from MMIDP sensors 25a-d for storage, display, and notification, among other functions, as described in detail below. In addition, MMIDP server 30 keeps MMIDP database 35 to store the network security policy, including older and updated versions of the policy, attack signatures, logs and alarms, and other reporting information.

Network security administrators use MMIDP GUIs 40a-d to analyze how MMIDP sensors 25a-d are handling incoming and outgoing network packets. MMIDP GUIs 40a-d can be accessed from any client connected to the network and provide access to all the functionalities of MMIDP sensors 25a-d and MMIDP server 30. MMIDP GUIs 40a-d enable network security administrators to view information coming from MMIDP sensors 25a-d and MMIDP server 30 to determine what is happening in the network and to take any subsequent action if necessary. The information provided by MMIDP sensors 25a-d and MMIDP server 30 is organized in reports that provide access to network statistics that otherwise would be difficult to gather, such as the top IP addresses used in attacks, the top attacks, the number of alarms and incidents generated, and whether an alarm is real or false, among other statistics. In addition, network security administrators may specify which signatures from the set of signatures stored in MMIDP database 35 will be used to detect and prevent attacks, as well as create new signatures. All communications between MMIDP sensors 25a-d, MMIDP server 30, MMIDP database 35, and MMIDP GUIs 40a-d are protected by encryption and authentication mechanisms.

Referring now to FIG. 3 is a schematic diagram of a preferred MMIDP system and the network environment in which the systems and methods of the present invention operate is described. MMIDP sensors 45a-c are placed at the gateway points of a private network consisting of remote office local area network 50, demilitarized zone ("DMZ") 55, and local area network 60, formed by wired network 65 and wireless network 70.

Wired network 65 is a local area network inside local area network 60 connecting MMIDP GUI 110a, personal computer user 67b, and notebook user 67c. Wireless network 70 is a wireless local area network inside local area network 60 connecting PDA user 73a and wireless telephone user 73b by means of base station 72. DMZ 55 is a neutral zone in the private network consisting of mail server 75 and web server 80 to handle all mail and web access requests from internal users in the network as well as from users outside of the network. DMZ 55 is used as a further layer of security to prevent outside users to have access to other servers in the private network besides mail server 75 and web server 80. It should be understood by one skilled in the art that remote office local area network 50, local area network 60, and DMZ 55 may comprise any electronic device capable of connecting to the Internet or other network operating with common protocols via a wired or wireless network, such as personal computers, notebook computers, personal digital assistants, wireless telephone systems, and video game systems, among others.

MMIDP sensors 45a-c are positioned at multiple gateway points of the private network inside firewalls 85a-b to inspect all the incoming packets to the private network that were deemed secure by firewalls 85a-b as well as all outgoing packets that are not checked by firewalls 85a-b. Placing MMIDP sensors 45a-c inside firewalls 85a-b reduces the traffic that MMIDP sensors 45a-c need to analyze since only the packet flows and connections accepted by firewalls 85a-b need to be checked. In addition, placing MMIDP sensors 45a-c inside firewalls 85a-b allows network security administrators to evaluate the performance of firewalls 85a-b. Firewalls 85a-b may be packet filtering firewalls, circuit-level firewalls, application-level firewalls, or stateful inspection firewalls. Preferably, firewalls 85a-b are stateful inspection firewalls that serve as entrance points to Internet 90, with firewall 85b connected to router 95 for routing the incoming network packets to either DMZ 55 or local area network 60.

MMIDP server 100 in local area network 60 is able to centrally manage MMIDP sensors 45a-c. MMIDP server 100 also maintains MMIDP database 105 to store network security policies, attack signatures, logs and alarms, and other reporting information.

Network security administrators use MMIDP GUIs 110a-c to define a network security policy and to instruct MMIDP central management server 100 to distribute the security policy to some or all of MMIDP sensors 45a-c. The network security policy defines which traffic to inspect and which attacks MMIDP sensors 45a-c should look for. MMIDP GUIs 110a-c enable network security administrators to view information coming from MMIDP sensors 45a-c, and MMIDP server 100 to determine what is happening in the network formed by remote office local area network 50, DMZ 55, and local area network 60. The information provided by MMIDP sensors 45a-c and MMIDP server 100 is organized in reports that provide access to a list of all the detected attacks and intrusions as well as network statistics that otherwise would be difficult to gather, such as the top IP addresses used in attacks, the top attacks, the number of alarms and incidents generated, and whether an alarm is real or false, among other statistics. In addition, network security administrators may specify which signatures from the set of signatures stored in MMIDP database 105 will be used to detect and prevent attacks, as well as create new signatures. It should be understood by one skilled in the art that MMIDP GUIs 110a-c are networking clients that may be placed on any network that has access to MMIDP server 100 through Internet 90.

Referring now to FIG. 4, a schematic diagram of an alternative MMIDP system and the network environment in which the systems and methods of the present invention operate is described. In this alternative, MMIDP sensors 45a-b are placed outside of firewalls 85a-c so that MMIDP sensors 45a-b are the entrance points to Internet 90. In addition, MMIDP sensor 45b is capable of supporting more than one network interface, such as network connection 47a and network connection 47b. This alternative may be used in cases where network security administrators are mostly concerned about attacks from outsiders. Placing MMIDP sensors 45a-b outside of firewalls 85a-c enables network security administrators to watch all the traffic that would typically be blocked by the firewall and would be undetected by an internal system.

Referring now to FIG. 5, a schematic diagram of another alternative MMIDP system and the network environment in which the systems and methods of the present invention operate is described. In this alternative, MMIDP sensors 45a-b are fully responsible for the security of the private network formed by remote office local area network 50, DMZ 55, and local area network 60. There are no firewalls being used to protect the private network. MMIDP sensors 45a-b analyze all the incoming and outgoing packets in the private network. This alternative may be used in cases where network security administrators are confident that MMIDP sensors 45a-b will be able to handle the volume of traffic to and from the network or in cases where network security administrators are not able to invest the time and money required to purchase an additional firewall system that has to be integrated and fully compliant with the other systems on the network.

Referring now to FIG. 6, a schematic view of the exemplary software modules used in the network intrusion detection and prevention sensor is described. MMIDP sensors 25a-d detect and prevent network security attacks with the use of eight software modules: (1) IP defragmentation software module 115; (2) flow manager software module 120; (3) TCP reassembly software module 125; (4) protocol anomaly detection software module 130; (5) stateful signature detection software module 135; (6) traffic signature detection software module 140; (7) IP router software module 145; and (8) IP forwarder software module 150.

IP defragmentation software module 115 reconstructs packets that were fragmented prior to reaching MMIDP sensors 25*a-d*. Packets are fragmented at network gateways when they are larger than the maximum packet size allowed in the network. The packets are reassembled according to the algorithm specified in the RFC 815 standard of the Internet Engineering Task Force. The algorithm can reassemble any number of packet fragments arriving in any order with any possible pattern of fragment overlap and duplication by keeping a buffer of length equal to the length of the packet being reassembled. The length of the packet is specified in the packet header. IP defragmentation software module 115 also performs security verification checks on the packet fragments, throwing out and reporting fragments whose parameters (such as packet length or packet offset) are known to be malicious and potentially dangerous.

After the packets are reconstructed by IP defragmentation software module 115, flow manager software module 120 organizes the packets into "packet flows", also referred to as flows, and associates them with a single communication session. A packet flow is a sequence of packets that flow from a source to a destination. That is, packets are organized according to whether they originate at the private network and flow to the outside network or vice-versa, and according to whether they are part of a TELNET session, FTP session, HTTP session, and so on. Control and data flows are grouped into the same session. Flow manager software module 120 organizes all the packet flows coming to and from the private network into a flow table that is implemented as a hash table for easy access by software modules 130, 135, and 140.

Referring now to FIG. 7, an exemplary flow table constructed by the flow manager software module is described. Flow table 155 is implemented as a hash table that organizes the packets coming into MMIDP sensors 25*a-d* into packet flows and sessions. The hash table may have "n" cells or buckets, such as the 8 hash buckets shown for flow table 155. Each bucket in the table consists of a pointer to a linked list of packet flow descriptors that is addressed by a hash value. The hash value is computed by a perfect hash function that hashes the values of a 5-tuple consisting of <source IP address, source port, destination IP address, destination port, protocol> into a unique integer in the range of 1 to "n". For example, flow table 155 contains hash table buckets 153*a-h*, with each bucket being addressed by an integer hash value ranging from 1 to 8. Furthermore, each packet flow descriptor is addressed by a 5-tuple key which is unique to that flow and is made of that flow's 5-tuple <source IP address, source port, destination IP address, destination port, protocol>.

The packet flow descriptors addressed by each key consist of information about each specific packet flow, including the 5-tuple above as well as the list of packets that belong to the described packet flow. For example, hash table bucket 153*a* points to packet flow descriptors 156*a* and 156*b*, while hash table bucket 153*c* points to packet flow descriptor 157. In addition, each packet flow in the list is associated to a session, such as TELNET session 161, FTP session 162, and HTTP session 163. The association is done by a double pointer (represented by the double arrows in FIG. 7) so that each packet flow descriptor points to a session and the session points back to each packet flow descriptor. The double pointer enables protocol anomaly detection software module 130, stateful signature detection software module 135, and traffic signature detection software module 140 to quickly and accurately retrieve information about incoming packet flows and their associated sessions. Packet flow descriptor 156*a*, for example, contains information about a TELNET flow from source A to destination B, as well as a list of packets that belong to that packet flow. Packet flow descriptors addressed by the same hash key (and belonging to the same hash bucket) may point to different sessions and packet flows descriptors belonging to the same session may be addressed by different hash keys. For example, packet flow descriptors 156*a-b* are both in hash bucket 153*a*, but packet flow descriptor 156*a* is associated to TELNET session 161 while packet flow descriptor 156*b* is associated to FTP session 162, which is also associated to packet flow descriptors 157, 158, and 159*b*, all belonging to different hash buckets.

Referring now to FIG. 8, a flow chart showing exemplary steps taken by the flow manager software module when new packets arrive at the network intrusion detection and prevention sensor is described. When a new flow of packets arrive at MMIDP sensors 25*a-d*, flow manager software module 120 identifies the source, destination, the source port, the destination port, and the protocol used for the packets at step 170 to compute the perfect hash function that maps the 5-tuple identifier into a distinct integer key at step 175. At step 180, flow manager software module 120 determines whether the key addresses an already existing packet flow descriptor in the hash table. If the key does not correspond to an existing packet flow descriptor, a new packet flow descriptor is inserted in the table at step 185.

At step 190, the system extracts a pointer to the packet flow descriptor for the incoming packet. Lastly, at step 200, flow manager software module 120 passes the pointer to the packet flow descriptor and its corresponding session, as extracted in step 190, to detection modules 130, 135, and 140. This enables protocol anomaly detection software module 130, stateful signature detection module 135, and traffic signature detection software module 140 to quickly and accurately retrieve information about an incoming packet flow descriptor and its associated session from its pointer.

Referring back to FIG. 6, the TCP packets in all the packet flows in the flow table are reassembled by TCP reassembly software module 125. TCP reassembly software module 125 arranges TCP packets that are part of a stream of packets in their correct order, while removing duplicate packets and packet overlap. Each TCP packet has a sequence number in its header, which enables software module 125 to rearrange TCP packets in their correct order when they arrive out of sequence or when they are unnecessarily re-transmitted in case they are delayed in the network by a longer time period than tolerated by the network.

IP defragmentation software module 115, flow manager software module 120, and TCP reassembly software module 125 enable MMIDP sensors 25*a-d* to detect and prevent security attacks faster and more accurately than other currently available intrusion detection systems. Intruding packets are detected and prevented from spreading to the private or outside networks by protocol anomaly detection software module 130, stateful signature detection software module 135, and traffic signature detection software module 140.

Referring now to FIG. 9, a flow chart showing exemplary steps taken by the protocol anomaly detection software module when packets arrive at the network intrusion detection and prevention sensor running at gateway mode is described. Protocol anomaly detection software module 130 examines the packet flows arranged by flow manager software module 125 in flow table 155 to determine irregularities in the network protocol specifications in non-TCP packets and TCP data streams. At step 215, protocol anomaly detection software module 130 accesses the packet flow descriptor and session corresponding to the packets arriving at MMIDP sensors 25*a-d* from the pointer to the packet flow descriptor and session passed by flow manager software module 120.

At step 220, protocol anomaly detection software module 130 examines the packet flow and session to determine which protocols need to be checked for irregularities. At step 225, protocol anomaly detection software module 130 performs high speed protocol verification by querying a protocol database that contains a list of protocols supported by MMIDP system 23 and the allowable actions for each protocol. Protocol anomaly detection software module 130 queries the protocol database to determine whether the incoming packets are compliant with the protocol used to transmit them and whether the actions or commands embodied in the non-TCP packets or TCP data streams are authorized or allowed for the protocol. Steps 220 and 225 enable protocol anomaly detection 130 to check for protocol irregularities much more quickly and accurately than other typical anomaly detection systems. If the protocol specifications in the protocol database do not match the protocol specifications in the packets (step 230), the packets are dropped at step 235.

Referring now to FIG. 10, an exemplary table of protocols supported by the private network is described. Protocol table 245 lists the protocols that are supported by MMIDP system 23 and some of their corresponding RFC standard specification, if any. It should be understood by one skilled in the art that additional protocols not listed in protocol table 245 such as ICMP may also be supported by the private network.

Referring back to FIG. 6, stateful signature detection software module 135 matches known attack signatures to the packet headers and data according to the network protocol used to transmit the packet. Software module 135 downloads known attack signatures from MMIDP database 35 run by MMIDP server 30 each time a signature update is made. Signature updates are made whenever new signature attack patterns are learned by network security administrators or by the vendors of MMIDP system 23. Preferably, new signatures will be updated within a week of being characterized in the Internet or other public domain forums.

The signatures are compared only to the relevant portion of the data stream or data packets. This is done utilizing two mechanisms. The first makes sure that signatures are only compared against traffic from relevant packet flows. For example, SMTP signatures will not be compared against FTP data. The second mechanism analyzes the traffic to understand the state of the packet and data stream communications. This analysis allows MMIDP to distinguish, for example, between SMTP commands and SMTP data lines or FTP user names and FTP file names. That is, stateful signature detection software module 135 compares signatures that are relevant to the data protocol to the relevant portion of the data. For example, not only will a signature that looks for a certain SMTP command be compared only to SMTP traffic, but the comparison is restricted to what is analyzed to be an SMTP command in the SMTP traffic. That is, by examining the attributes of the packet flow's session entry, such as sessions 161-163 in flow table 155, signature detection software module 135 is able to determine which signatures need to be matched against the packet flow. This considerably improves the performance of signature detection software module 135 since only the signatures that are meaningful to the packet flow need to be analyzed.

Referring now to FIG. 11, a flow chart showing exemplary steps taken by the stateful signature detection software module when packets arrive at the network intrusion detection and prevention sensor running at gateway mode is described. At step 210, stateful signature detection software module 135 accesses the packet flow descriptor and session corresponding to the packets arriving at MMIDP sensors 25*a-d* from the pointer to the packet flow descriptor and session passed by flow manager software module 120.

At step 260, software module 135 queries MMIDP database 35 to find the signatures that are relevant to the incoming data stream or packets. The relevant signatures are those that would only be considered attacks in the context of the packet flow and session retrieved from the flow table. The relevant signatures are converted into regular expressions when stored in database 35. Regular expressions are patterns that describe portions of strings. For example, the regular expression "[0123456789]" matches any single digit in UNIX-based operating systems. Converting the signatures into regular expressions enables software module 135 to efficiently match signatures against packets.

At step 265, software module 135 checks whether the incoming packets belong to a TCP flow. If not, at step 275, the signatures are compared to the incoming packets using, for example, Deterministic Finite Automata ("DFA"). DFA signature matching builds a state machine for each regular expression to quickly decide whether the regular expression is present in the incoming packets. If the incoming packets are of a TCP flow, the signatures are compared to the entire TCP data stream (step 270).

If any matching signatures are found (step 280), the corresponding packets and the flow to which they belong are dropped by software module 135 at step 290. Otherwise, the incoming packets free of matching signatures are delivered to traffic signature detection software module 140. It is understood by those skilled in the art that other pattern matching algorithms besides DFA matching can be used to match attack signatures.

Referring back to FIG. 6, traffic signature software module 140 matches traffic signatures to the network traffic to detect, for example, port scans and network sweeps. The traffic signatures are downloaded to software module 140 from MMIDP database 35 maintained by MMIDP server 30.

Referring now to FIG. 12, a flow chart showing exemplary steps taken by the traffic signature detection software module when packets arrive at the network intrusion detection and prevention sensor running at gateway mode is described. The steps taken by traffic signature detection software module 140 are similar to those taken by stateful signature detection software module 135 to detect attack signatures. At step 310, traffic signature detection software module 140 accesses the packet flow descriptor and session corresponding to the packets arriving at MMIDP sensors 25*a-d* from the pointer to the packet flow descriptor and session passed by flow manager software module 120.

At step 315, traffic signature detection software module 140 queries MMIDP database 35 to find the traffic signatures that are relevant to the flow of the incoming packets. The relevant signatures are found by examining the protocol of the flow to which the incoming packets belong. For example, if the incoming packets are part of an ICMP packet flow, software module 140 will only consider ICMP-based traffic signatures.

At step 320, the traffic signatures are matched to the incoming data stream or packets. If any matching signatures are found, software module 140 updates a signature-specific count as specified by the traffic signature at step 325. The signature count may, for example, count how many different hosts were contacted from the same IP address, during a given time period, and so on. If the signature count is above a pre-determined threshold (step 330), then software module 140 generates an alarm to be displayed at MMIDP GUIs 40*a-d* at step 335.

Referring back to FIG. 6, MMIDP sensors 25*a-d* are also equipped with IP router software module 145 and IP forwarder software module 150 to route incoming and outgoing packets to the appropriate points in the network (IP router software module 145) and to use the routing information to forward the packets to their destination (IP forwarder software module 150). IP forwarder software module 150 has full control over which packets will be allowed through MMIDP sensors 25*a-d* and will not let packets that any of the other software modules has deemed malicious to go through.

Referring now to FIG. 13, a flow chart showing exemplary steps taken by the network intrusion detection and prevention sensor when determining the validity of an incoming or outgoing packet is described. At step 350, the packet fragments arriving at MMIDP sensors 25*a-d* are reconstructed into packets by IP defragmentation software module 115. At step 355, flow manager software module 120 in MMIDP sensors 25*a-d* organizes the incoming packets into packet flows and sessions in a flow table as described above. At step 360, MMIDP sensors 25*a-d* check whether there are any TCP packets among the incoming packets. If so, the TCP packets are reordered at step 365. At step 370, protocol anomaly detection software module 130 checks to see if there are any protocol irregularities in the packets. Any packet presenting protocol irregularities will be dropped at step 380.

The packets conforming to the network protocol specifications of the protocols listed in table 245 (FIG. 10) will then proceed to stateful signature detection software module 135 at step 375 to be matched against attack signatures downloaded to MMIDP sensors 25*a-d* from MMIDP database 35. As described above, only the relevant signatures are checked, thereby considerably speeding up the signature matching process as compared to previously-known signature-based systems. If there are any signatures matching information in a given non-TCP packet or TCP data stream, the packet or stream is dropped at step 380.

Packets containing no matching signatures are passed on to traffic signature detection software module 140 at step 385 for determining whether there are any traffic signatures that match the packet flows associated with the packets being analyzed. If there are any matching traffic signatures and the internal counters of any of these traffic signatures surpasses a pre-determined threshold (steps 390, 400), then MMIDP sensors 25*a-d* generate an alarm at step 405 to be displayed at MMIDP GUIs 40*a-d* indicating a network sweep or port scan at the network.

Lastly, all the packets free of protocol irregularities and matching attack and traffic signatures are routed and forwarded to their appropriate network destinations by IP router software module 145 and IP forwarder software module 150 at step 410. It should be understood by one skilled in the art that all the steps described above in connection with FIG. 13 are performed upon the arrival of each new packet at MMIDP sensors 25*a-d*. It should also be understood by one skilled in the art that steps 370, 375, and 385 may be performed in a different order.

Referring now to FIG. 14, a schematic view of exemplary functions performed by the network intrusion detection and prevention graphical user interface is described. MMIDP GUIs 40*a-d* can be accessed from any client connected to the network and provide access to all the functionalities of MMIDP server 30 and MMIDP sensors 25*a-d*. Configuration interface 420 allows network security administrators to install MMIDP sensors 25*a-d* and perform other configuration functions related to their maintenance. Security policy editor 425 enables network security administrators to specify a network security policy to define which traffic to inspect and which attacks MMIDP sensors 25*a-d* should look for. Logs and alarms viewer 430 enables network security administrators to view information coming from MMIDP sensors 25*a-d* and MMIDP server 30 to determine what is happening in the network. Logs describe the packet activity coming through MMIDP sensors 25*a-d* and alarms are generated by MMIDP sensors 25*a-d* when an attack has been attempted on the network. The alarms are classified into new, real, false, or closed, that is, alarms that are no longer active due to the packets attempting the attack being dropped. Network security administrators may view logs according to the order in which they are generated by MMIDP sensors 25*a-d* and according to other specified criteria such as their date, the source IP address, the destination IP address, and so on. The logs may be viewed in real time and at different levels of detail. All the logs may be backed up and stored in MMIDP database 35.

The information provided by MMIDP sensors 25*a-d* and MMIDP server 30 is organized in reports that provide access to network statistics that otherwise would be difficult to gather, such as the top IP addresses used in attacks, the top attacks, the number of alarms and incidents generated, and whether an alarm is real or false, among other statistics. The reports are displayed within reports viewer 435. In addition, network security administrators may specify which signatures from the set of signatures stored in MMIDP database 35 will be used to detect and prevent attacks, as well as create new signatures.

Lastly, status viewer 440 enables network security administrators to monitor the status of MMIDP sensors 25*a-d*, MMIDP server 30, and other network resources. It is understood by one skilled in the art that MMIDP GUIs 40*a-d* may perform additional functions other than the ones described above in connection with FIG. 14.

Referring now to FIG. 15, a schematic view of exemplary functions performed by the network intrusion detection and prevention central management server is described. MMIDP server 30 collects the logs and alarms from MMIDP sensors 25*a-d* (445) for storage, display, and notification, and information about the status of MMIDP sensors 25*a-d* (450), among other functions. In addition, MMIDP server 30 keeps MMIDP database 35 to store the network security policy (455), attack signatures, logs and alarms, and other reporting information. Whenever MMDIP sensors 25*a-d* match attack and traffic signatures against incoming and outgoing packets, MMIDP server 30 distributes the network security policy or policy updates stored in MMDIP database 35 to the sensors (460). MMIDP server 30 is also responsible for updating MMIDP database 35 whenever new signatures are specified by network security administrators using MMIDP GUIs 40*a-d* (465). It is understood by one skilled in the art that MMIDP server 30 may perform additional functions other than the ones described above in connection with FIG. 15.

Referring now to FIG. 16, a flow chart illustrating exemplary steps taken by a network intrusion detection and prevention sensor, server, and graphical user interface when an FTP bounce attack is imminent on the network is described. At step 475, a user connects to an FTP server in the network to download or upload files. When this happens, the FTP user's software provides the FTP server at step 480 an IP address and a port number to which the file should be sent or taken from. This is done via an FTP "port" command. In practice, the IP address is that of the user, but the port command does not limit the IP address to the user's address. Because of this, an attacker can tell the FTP server to open a connection to an IP address that is different from the user's address and transfer files from the FTP server to it. To detect this attack, the MMIDP sensor needs to compare the requests to the port command with the IP address of the user and send an alarm to the user or close the FTP connection if the IP addresses do not match.

At step 485, the user sends an IP address to the FTP server that is different from the user's IP address. Prior to the packets containing the user's IP address reach the FTP server, the MMIDP sensor reconstructs any packet fragments at step 490 and organizes the packets into an incoming FTP packet flow at step 495. At step 500, the MMID sensor reassembles the TCP packet fragments into client-to-server and server-to-client data streams. At step 505, protocol anomaly detection software module 130 in the MMIDP sensor checks whether the packet is part of an FTP port command. If it is, the MMIDP sensor compares the IP address of the user to the one specified by the port command. At step 510, MMIDP checks if there was no PORT command, or if the IP address match. If either is true, the MMIDP sensor skips to step 520. If there was a PORT command and the IP address did not match, the MMIDP sensor drops the corresponding FTP packets, sends an alarm to MMIDP server 30, and closes the FTP connection at step 515. Lastly, at step 520, MMIDP server 30 collects log and packet information from the MMIDP sensor and sends it to MMIDP GUIs 40a-d for display.

Referring now to FIG. 17, a flow chart illustrating exemplary steps taken by a network intrusion detection and prevention sensor, server, and graphical user interface when an SMTP "wiz" attack is imminent on the network is described. The "wiz" attack occurs when an attacker uses the "wiz" command in an SMTP session with certain vulnerable SMTP servers to unlawfully gain root access on a network host. When successful, the attacker can take complete control over the network host, use it as a platform for launching further attacks, steal e-mail and other data, and ultimately gain access to the network resources. Since the "wiz" string can often appear in an e-mail body, recipient list, and so on, there is a high probability of generating false alarms if the signature matching is not done within the context of a client to server SMTP flow in "command mode."

At step 535, a user connects to an SMTP server in the network to establish an SMTP session. At step 540, the SMTP server establishes a TCP connection with the user through a 3-way handshake by exchanging SYN and ACK packets. When the TCP connection is established, the user sends the "wiz" command to the SMTP mail server at step 545 while the sendmail session is in command mode. At step 550, the MMIDP sensor reconstructs any packet fragments sent by the user. The reconstructed packets are organized into a SMTP packet flow at step 555. At step 560, the MMIDP sensor reassembles the TCP packet fragments into client-to-server and server-to-client data streams.

If there is an SMTP command present in the client-to-server data stream (step 565), the MMIDP sensor searches for the "wiz" signature in the SMTP command(s) at step 570. Once a signature match is found, the MMIDP sensor drops the SMTP packets, sends an alarm to MMIDP server 30, and closes the SMTP connection at step 575. Lastly, at step 580, MMIDP server 30 collects log and packet information from the MMIDP sensor and sends it to MMIDP GUIs 40a-d for display.

Although particular embodiments of the present invention have been described above in detail, it will be understood that this description is merely for purposes of illustration. Specific features of the invention are shown in some drawings and not in others, for purposes of convenience only, and any feature may be combined with other features in accordance with the invention. Steps of the described processes may be reordered or combined, and other steps may be included. Further variations will be apparent to one skilled in the art in light of this disclosure and such variations are intended to fall within the scope of the appended claims.

What is claimed is:

1. A method comprising:
   receiving, at a network device, a plurality of packets;
   inspecting, by the network device, the plurality of packets to determine whether the plurality of packets includes information indicative of a security breach,
   inspecting the plurality of packets including:
      inspecting the plurality of packets to identify one or more protocol irregularities, associated with the plurality of packets, to determine whether the plurality of packets includes the information indicative of the security breach, without a user request to inspect the plurality of packets to identify the one or more protocol irregularities,
      after inspecting the plurality of packets to identify the one or more protocol irregularities and when the plurality of packets does not include the one or more protocol irregularities:
         inspecting the plurality of packets to identify one or more attack signatures, associated with the plurality of packets, to determine whether the plurality of packets includes the information indicative of the security breach, without a user request to inspect the plurality of packets to identify the one or more attack signatures, and
      after inspecting the plurality of packets to identify the one or more attack signatures and when the plurality of packets does not include the one or more attack signatures:
         inspecting the plurality of packets to identify one or more traffic signatures, associated with the plurality of packets, to determine whether the plurality of packets includes the information indicative of the security breach, without a user request to inspect the plurality of packets to identify the one or more traffic signatures;
   dropping, by the network device, at least one packet of the plurality of packets when the at least one packet includes the information indicative of the security breach; and
   forwarding, by the network device, the at least one packet when the at least one packet does not include the information indicative of the security breach.

2. The method of claim 1, where inspecting the plurality of packets to identify the one or more protocol irregularities includes:
   identifying irregularities in network protocol specifications in the at least one packet.

3. The method of claim 1, where inspecting the plurality of packets to identify the one or more attack signatures includes:
   inspecting the plurality of packets to identify the one or more attack signatures using stateful signature detection.

4. The method of claim 1, where inspecting the plurality of packets to identify the one or more traffic signatures includes searching packet flow descriptors, associated with the plurality of packets, for traffic signatures.

5. The method of claim 1, further comprising:
   identifying a network attack identifier, associated with the at least one packet, based on inspecting the plurality of packets to identify the one or more protocol irregularities, where the network attack identifier comprises a protocol irregularity of the one or more protocol irregularities; and dropping the at least one packet based on identifying the network attack identifier.

6. The method of claim 1, further comprising:
identifying a network attack identifier, associated with the at least one packet, based on inspecting the plurality of packets to identify the one or more attack signatures, where the network attack identifier comprises an attack signature of the one or more attack signatures; and dropping the at least one packet based on identifying the network attack identifier.

7. The method of claim 1, further comprising:
identifying a plurality of network attack identifiers, associated with the at least one packet, based on inspecting the plurality of packets to identify the one or more traffic signatures, where the plurality of network attack identifiers identifier comprises the one or more traffic signatures; and
dropping the at least one packet based on identifying the plurality of network attack identifiers.

8. The method of claim 1, further comprising: identifying a plurality of network attack identifiers, associated with the at least one packet, based on inspecting the plurality of packets to identify the one or more attack signatures and inspecting the plurality of packets to identify the one or more traffic signatures, where the plurality of network attack identifiers comprises the one or more attack signatures and the one or more traffic signatures; and
dropping the at least one packet based on identifying the plurality of network attack identifiers.

9. The method of claim 6, where the attack signature is stored in a memory, and
where inspecting the plurality of packets to identify the one or more attack signatures includes:
comparing a portion of the at least one packet to the attack signature stored in the memory.

10. The method of claim 1, where inspecting the plurality of packets to identify the one or more attack signatures comprises:
querying a memory, that stores a plurality of attack signatures, to identify the one or more attack signatures, the plurality of attack signatures including the one or more attack signatures; and
comparing the one or more attack signatures to information included in the plurality of packets.

11. The method of claim 1, further comprising: reconstructing a plurality of packet fragments into the plurality of packets.

12. A system comprising:
a device to:
receive a plurality of packets;
inspect the plurality of packets to determine whether the plurality of packets includes information indicative of a security breach,
when inspecting the plurality of packets, the device is to:
inspect the plurality of packets to identify one or more protocol irregularities, associated with the plurality of packets, to determine whether the plurality of packets includes the information indicative of the security breach, without a user request to inspect the plurality of packets to identify the one or more protocol irregularities,
after inspecting the plurality of packets to identify the one or more protocol irregularities and when the plurality of packets does not include the one or more protocol irregularities:
inspect the plurality of packets to identify one or more attack signatures, associated with the plurality of packets, to determine whether the plurality of packets includes the information indicative of the security breach, without a user request to inspect the plurality of packets to identify the one or more attack signatures, and
after inspecting the plurality of packets to identify the one or more attack signatures and when the plurality of packets does not include the one or more attack signatures:
inspect the plurality of packets to identify one or more traffic signatures, associated with the plurality of packets, to determine whether the plurality of packets includes the information indicative of the security breach, without a user request to inspect the plurality of packets to identify the one or more traffic signatures;
drop at least one packet of the plurality of packets when the at least one packet includes the information indicative of the security breach; and
forward the at least one packet when the at least one packet does not include the information indicative of the security breach.

13. The system of claim 12, where the device further is to:
reconstruct a plurality of packet fragments into the plurality of packets.

14. The system of claim 12, where the device further is to:
detect the information indicative of the security breach based on inspecting the plurality of packets to identify the one or more attack signatures using a stateful signature detection module of the device.

15. The system of claim 12, where, when inspecting the plurality of packets to identify the one or more traffic signatures, the device is to use a traffic signature detection software module to search packet flow descriptors, associated with the plurality of packets, for the one or more traffic signatures.

16. The system of claim 12, where, when inspecting the plurality of packets to identify the one or more protocol irregularities, the device is further to identify irregularities in protocol specifications in the at least one packet.

17. The system of claim 12, where, when inspecting the plurality of packets to identify the one or more attack signatures, the device further is to:
query a memory to obtain the one or more attack signatures, and
compare the obtained one or more attack signatures to information included in the plurality of packets.

18. The system of claim 12, further comprising: another device to:
collect a plurality of security logs and alarms recording information about security breaches found in the plurality of packets;
store a network security policy identifying network traffic to inspect and a plurality of network attacks to be detected and prevented, the network security policy being associated with the collected plurality of security logs and alarms recording information;
distribute the network security policy to one or more gateway points in the network; and
update a memory that stores information identifying a plurality of protocols and information identifying a plurality of attack signatures.

19. A non-transitory computer-readable medium comprising:
a plurality of instructions which, when executed by a device, causes the device to:
receive a plurality of packets;

inspect the plurality of packets to determine whether the
plurality of packets includes information indicative of
a security breach,
one or more instructions, of the plurality of instructions,
to inspect the plurality of packets including:
one or more instructions to inspect the plurality of
packets to identify one or more protocol irregularities, associated with the plurality of packets, to
determine whether the plurality of packets includes
the information indicative of the security breach,
without a user request to inspect the plurality of
packets to identify the one or more protocol irregularities,
after inspecting the plurality of packets to identify the
one or more protocol irregularities and when the
plurality of packets does not include the one or
more protocol irregularities:
one or more instructions to inspect the plurality of
packets to identify one or more traffic signatures,
associated with the plurality of packets, to determine whether the plurality of packets includes
the information indicative of the security breach,
without a user request to inspect the plurality of
packets to identify the one or more traffic signatures, and
after inspecting the plurality of packets to identify the
one or more traffic signatures and when the plurality of packets does not include the one or more
traffic signatures:
one or more instructions to inspect the plurality of
packets to identify one or more attack signatures,
associated with the plurality of packets, to determine whether the plurality of packets includes the
information indicative of the security breach, without a user request to inspect the plurality of packets
to identify the one or more attack signatures;
drop at least one packet of the plurality of packets when
the at least one packet includes the information
indicative of the security breach; and
forward the at least one packet when the at least one
packet does not include the information indicative of
the security breach.

20. The non-transitory computer-readable medium of claim 19, where the device is located within a firewall.

21. The non-transitory computer-readable medium of claim 19, where the device is located outside a firewall.

22. The non-transitory computer-readable medium of claim 19, further comprising:
one or more instructions to reconstruct a plurality of packet fragments into the plurality of packets.

23. The non-transitory computer-readable medium of claim 19, further comprising a plurality of instructions which, when executed by a server, cause the server to:
collect a plurality of security logs and alarms recording information about the information indicative of the security breach found in the plurality of packets;
store a network security policy identifying network traffic to inspect and a plurality of network attacks to be detected and prevented, the network security policy being associated with the collected plurality of security logs and alarms recording information; and
distribute the network security policy to the device.

24. The non-transitory computer-readable medium of claim 19, further comprising one or more instructions to:
provide network security information for display to network security administrators;
provide status information regarding the device for display; and
specify a network security policy.

25. A device comprising:
at least one processor to:
receive a plurality of packets;
inspect the plurality of packets to determine whether the
plurality of packets includes information indicative of
a security breach,
when inspecting the plurality of packets, the at least one
processor is to:
inspect the plurality of packets to identify one or more
protocol irregularities, associated with the plurality
of packets, to determine whether the plurality of
packets includes the information indicative of the
security breach, without a user request to inspect
the plurality of packets to identify the one or more
protocol irregularities,
when the plurality of packets does not include the one
or more protocol irregularities:
inspect the plurality of packets to identify one or
more traffic signatures, associated with the plurality of packets, to determine whether the plurality of packets includes the information indicative of the security breach, without a user request
to inspect the plurality of packets to identify the
one or more traffic signatures, and
when the plurality of packets does not include the one
or more traffic signatures:
inspect the plurality of packets to identify one or
more attack signatures, associated with the plurality of packets, to determine whether the plurality of packets includes the information indicative of the security breach, without a user request
to inspect the plurality of packets to identify the
one or more attack signatures;
drop at least one packet of the plurality of packets when
the at least one packet includes the information
indicative of the security breach; and
forward the at least one packet when the at least one
packet does not include the information indicative of
the security breach.

26. The device of claim 25, where the at least one processor is further to:
reconstruct a plurality of packet fragments into the plurality of packets.

27. The device of claim 25, where a network security policy, identifying network traffic to inspect and a plurality of network attacks to be detected and prevented, is defined by a network security administrator using a graphical user interface associated with the device.

28. The device of claim 27, where the at least one processor is further to provide:
network security information to the graphical user interface for display to network security administrators;
status information regarding the device to the graphical user interface for display; and
information specifying the network security policy to the graphical user interface for display.

29. The device of claim 25, where a network security policy, identifying network traffic to inspect and a plurality of network attacks to be detected and prevented, is stored by and distributed to the device by a server.

30. The device of claim 25, where the at least one processor is further to:

inspect the plurality of packets to identify the one or more protocol irregularities using a protocol anomaly detection software module.

31. The device of claim 25, where the at least one processor is further to:
inspect the plurality of packets to identify the one or more attack signatures using a stateful signature detection software module.

32. The device of claim 25, where the at least one processor is further to:
identify a network attack identifier, associated with the at least one packet, based on inspecting the plurality of packets to identify the one or more protocol irregularities, where the network attack identifier comprises a protocol irregularity of the one or more protocol irregularities; and
drop the at least one packet based on identifying the network attack identifier.

33. The device of claim 25, where the at least one processor is further to:
identify a network attack identifier, associated with the at least one packet, based on inspecting the plurality of packets to identify the one or more attack signatures, where the network attack identifier comprises an attack signature of the one or more attack signatures; and drop the at least one packet based on identifying the network attack identifier.

34. A method comprising:
receiving, at a network device, a plurality of packets;
inspecting, by the network device, the plurality of packets to determine whether the plurality of packets includes information indicative of a security breach,
inspecting the plurality of packets including:
inspecting the plurality of packets to identify one or more attack signatures, associated with the plurality of packets, to determine whether the plurality of packets includes the information indicative of the security breach, without a user request to inspect the plurality of packets to identify the one or more attack signatures,
when the plurality of packets does not include the one or more attack signatures:
inspecting the plurality of packets to identify one or more protocol irregularities, associated with the plurality of packets, to determine whether the plurality of packets includes the information indicative of the security breach, without a user request to inspect the plurality of packets to identify the one or more protocol irregularities, and
when the plurality of packets does not include the one or more protocol irregularities:
inspecting the plurality of packets to identify one or more traffic signatures, associated with the plurality of packets, to determine whether the plurality of packets includes the information indicative of the security breach, without a user request to inspect the plurality of packets to identify the one or more traffic signatures;

dropping, by the network device, at least one packet of the plurality of packets when the at least one packet includes the information indicative of the security breach; and
forwarding, by the network device, the at least one packet when the at least one packet does not include the information indicative of the security breach.

35. The method of claim 34, further comprising: identifying a network attack identifier, associated with the at least one packet, based on inspecting the plurality of packets to identify the one or more protocol irregularities, where the network attack identifier comprises a protocol irregularity of the one or more protocol irregularities; and
dropping the at least one packet based on identifying the network attack identifier.

36. A method comprising:
receiving, at a network device, a plurality of packets;
inspecting, by the network device, the plurality of packets to determine whether the plurality of packets includes information indicative of a security breach,
inspecting the plurality of packets including:
inspecting the plurality of packets to identify one or more traffic signatures, associated with the plurality of packets, to determine whether the plurality of packets includes the information indicative of the security breach, without a user request to inspect the plurality of packets to identify the one or more traffic signatures,
when the plurality of packets does not include the one or more traffic signatures:
inspecting the plurality of packets to identify one or more protocol irregularities, associated with the plurality of packets, to determine whether the plurality of packets includes the information indicative of the security breach, without a user request to inspect the plurality of packets to identify the one or more protocol irregularities, and
when the plurality of packets does not include the one or more protocol irregularities:
inspecting the plurality of packets to identify one or more attack signatures, associated with the plurality of packets, to determine whether the plurality of packets includes the information indicative of the security breach, without a user request to inspect the plurality of packets to identify the one or more attack signatures;
dropping, by the network device, at least one packet of the plurality of packets when the at least one packet includes the information indicative of the security breach; and
forwarding, by the network device, the at least one packet when the at least one packet does not include the information indicative of the security breach.

37. The method of claim 36, further comprising: identifying a network attack identifier, associated with the at least one packet, based on inspecting the plurality of packets to identify the one or more attack signatures, where the network attack identifier comprises an attack signature of the one or more attack signatures; and
dropping the at least one packet based on identifying the network attack identifier.

* * * * *